United States Patent
Ben-Shachar et al.

(10) Patent No.: US 7,810,148 B2
(45) Date of Patent: Oct. 5, 2010

(54) ENABLING TERMINAL SERVICES THROUGH A FIREWALL

(75) Inventors: Ido Ben-Shachar, Kirkland, WA (US); John E. Parsons, Jr., Sammamish, WA (US); Kamen K Moutafov, Sammamish, WA (US); Meher P Malakapalli, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1438 days.

(21) Appl. No.: 11/067,125

(22) Filed: Feb. 25, 2005

(65) Prior Publication Data

US 2006/0195895 A1    Aug. 31, 2006

(51) Int. Cl.
G06F 9/00 (2006.01)
(52) U.S. Cl. .......................................... 726/11
(58) Field of Classification Search ............ 726/11
See application file for complete search history.

(56) References Cited

U.S. PATENT DOCUMENTS

| | | | |
|---|---|---|---|
| 2002/0165993 A1* | 11/2002 | Kramer | 709/315 |
| 2005/0044197 A1* | 2/2005 | Lai | 709/223 |
| 2005/0114658 A1* | 5/2005 | Dye et al. | 713/165 |

OTHER PUBLICATIONS

Adam's Mindspace, R2 will have RDP over HTTP Proxy, Jun. 3, 2004.*

* cited by examiner

*Primary Examiner*—Kambiz Zand
*Assistant Examiner*—Aubrey H Wyszynski

(57) ABSTRACT

Systems and methods are described that provide terminal services through a firewall. In one implementation, data is wrapped with an RPC-based protocol, wherein the data to be wrapped is configured according to a stream-based protocol consistent with establishing a server/client relationship. The RPC-based protocol is then layered over HTTPS. The wrapped data is then passed through the firewall.

19 Claims, 20 Drawing Sheets

Fig. 11   Forwarder / RPC Reconstructor Sequence
(Write completion to TS not shown)

Client-Server 2K Bytes Split
(Note: Initial binding, not shown here, is 1K)

Server-Client 2K Bytes Packet Split
(Multi-Async)
(Note: Initial binding & Request,
not shown here, is 4K)

Server-Client 2K Bytes Packet Split
(Async Pipes)
(Note: Initial binding,
not shown here, is 1K)

ENABLING TERMINAL SERVICES THROUGH A FIREWALL

TECHNICAL FIELD

The present disclosure generally relates to systems and methods for establishing a terminal server/terminal server client relationship through a firewall, and more particularly to layering a protocol adapted for terminal services on top of a protocol adapted for traversing a firewall.

BACKGROUND

Within a firewall, it is relatively easy to configure server and client computers, wherein the client is able to access applications and data contained on a server. Protocols, which are not resistant to attack if exposed to the Internet, can be utilized effectively in such an environment, which is typical of corporate intranets. Unfortunately, such a configuration does not provide for utilization of server resource outside the firewall.

Putting the server on the Internet is not an option, since it would be vigorously attacked with disastrous consequences. As a result, it is common for corporate employees to utilize VPN (virtual private network) technology to traverse the firewall and access the server from remote sites, such as from home or travel. While VPN technology provides a workable solution in many applications, VPN connections are hard to setup and maintain.

Accordingly, there is a need to provide alternate systems and methods that provide users with access to server resources inside the firewall, without compromising those resources to attack.

SUMMARY

Systems and methods are described that provide terminal services through a firewall. In one implementation, data is wrapped with an RPC-based protocol, wherein the data to be wrapped is configured according to a stream-based protocol consistent with establishing a server/client relationship. The RPC-based protocol is then layered over HTTPS. The wrapped data is then passed through the firewall.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 21 illustrates an exemplary computing environment suitable for implementing terminal services through a firewall.

DETAILED DESCRIPTION

Overview

The following discussion is directed to systems and methods that enable terminal services through a firewall. In one implementation, data configured as RDP (remote desktop protocol) is wrapped with an RPC-based (remote procedure call) protocol. The RPC data is therefore adapted for use with an RPC API, allowing it to be wrapped again using an HTTPS protocol. The RDP/RPC/HTTPS wrapped data is passed through the firewall, thereby allowing establishment of a terminal server client/terminal server session on opposites sides of a firewall.

Exemplary Environment

Figure 1:
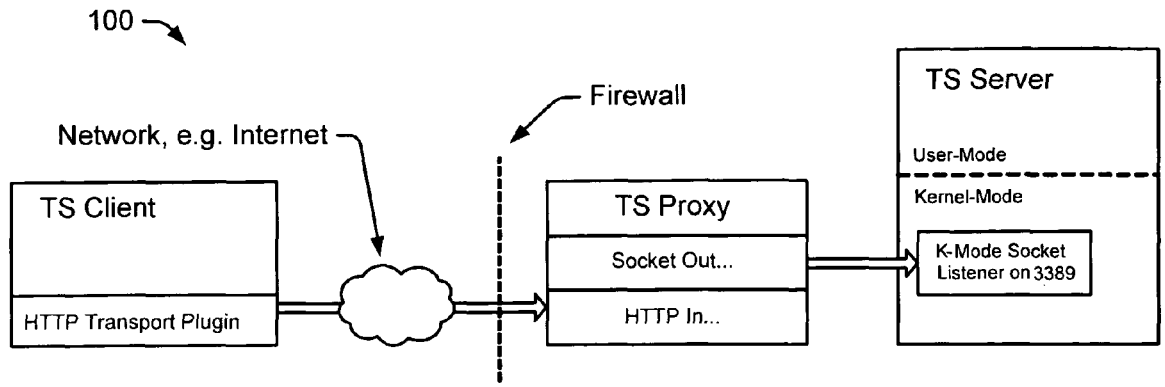
FIG. 1 illustrates a terminal server proxy, wherein terminal server protocol is wrapped in HTTPS headers.

FIG. 1 shows an implementation 100 enabling terminal services through a firewall, wherein a terminal server proxy wraps a terminal server protocol, such as Microsoft's RDP protocol, in HTTPS headers. In this implementation, terminal services pass through a firewall, assisted by a TS (terminal server) client plug-in and a plug-in for the proxy. Extensive coding is required by this implementation to upgrade the prior art to provide the desired trans-firewall performance, due to failure to leverage existing code.

Figure 2:
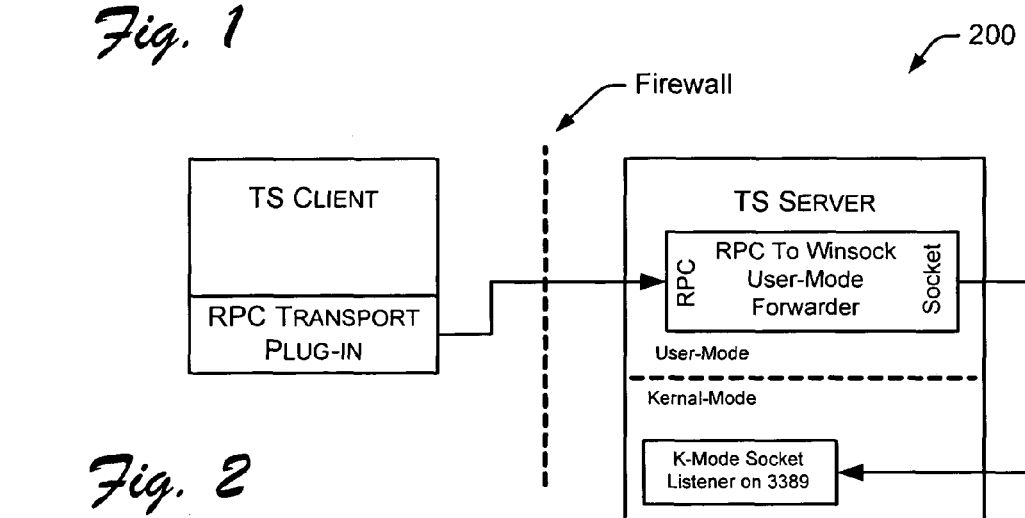
FIG. 2 illustrates a generalized and exemplary system wherein an existing RPC/HTTP proxy is leveraged, thereby providing a terminal services protocol over RPC/HTTP.

FIG. 2 shows a generalized example of an implementation 200, wherein an existing RPC/HTTP (remote procedure call/hypertext transport protocol) proxy is leveraged, thereby providing a terminal services protocol (e.g. Microsoft's RDP (remote desktop protocol)) over RPC/HTTP. The architecture of the implementation 200 illustrates that by wrapping the RDP protocol within RPC calls, an existing RPC-based proxy can be advantageously utilized. In particular, the RPC Transport Plug-In wraps the RDP stream providing communication between the terminal server client and the terminal server within RPC protocol. This facilitates utilization of an RPC-based proxy, thereby enabling firewall-navigation.

Figure 3:
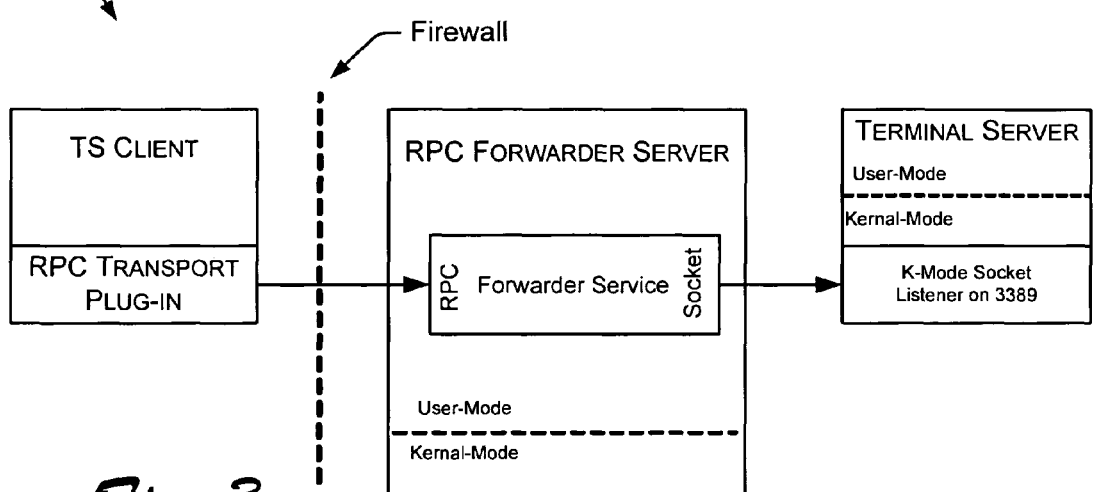
FIG. 3 illustrates a configuration wherein a forwarder service is located in a dedicated RPC forwarder server, and is in communication with a terminal server.

FIG. 3 shows one possible alternate configuration 300. In the implementation 300, the Forwarder Service has been moved into a dedicated RPC forwarder server, in communication with the Terminal Server. In this configuration, all Terminal Server (TS) platforms are supported since no changes are required on the TS.

Figure 4:
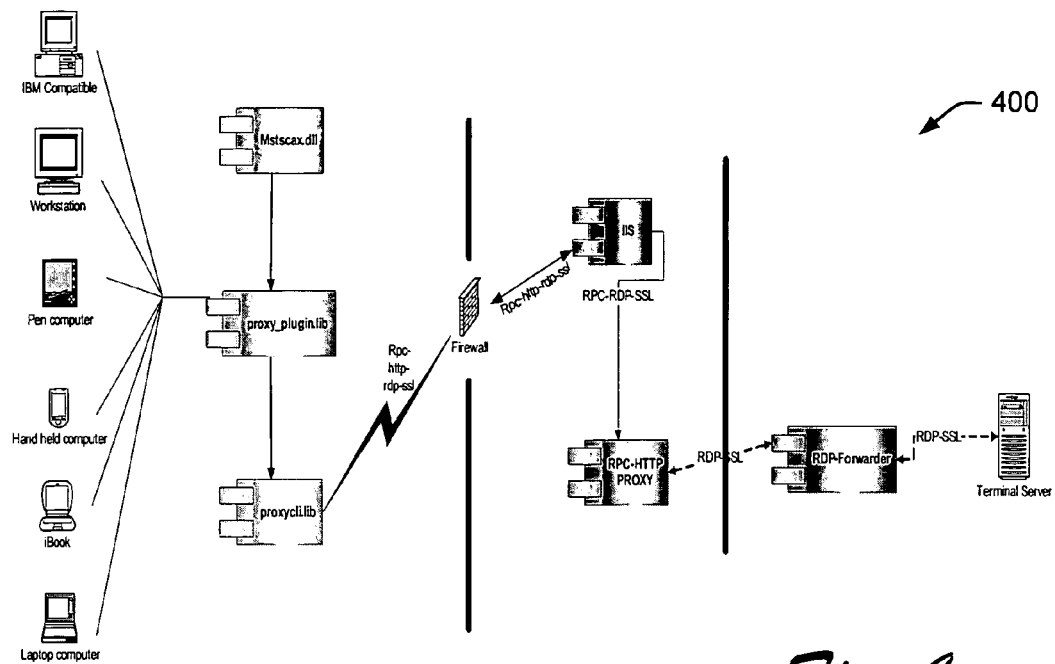
FIG. 4 illustrates an example of a terminal server proxy, wherein RPC protocol is sent over an existing HTTP infrastructure.

FIG. 4 shows a high-level overview of a system 400 implementing a TS proxy. TS traffic is wrapped in RPC protocol and sent over an existing HTTP infrastructure adapted for use with RPC. In the embodiment of FIG. 4, RDP/SSL data is encapsulated initially by RPC packets, thereby assuming a form consistent with RPC data, and encapsulated subsequently by RPC over HTTP as HTTP data.

Within FIG. 4, the left-most boxes show the client system (mstsc/mstscax and plug-ins) which generate the RDP/SSL and RPC data. The middle section of FIG. 4 shows the RPC over HTTP proxy that lives on IIS (in a Microsoft embodiment) which proxies the RPC traffic. The right-most portion of FIG. 4 shows the RDP data forwarding, in this example using an RPC re-constructor that unwraps the RPC data and forwards the RDP/SSL data to the terminal server.

A rules engine is typically located on the server wherein the RPC re-constructor is resident. The proxy will govern what capabilities are allowed for each remote (typically, Internet) user. In one example of the rules engine, within an enterprise a user may be allow to redirect his devices. A systems administrator may want to disable this capability when such redirection results in access to resources over the Internet. Accordingly, the rules engine may require that this capability be disabled.

Figure 5:
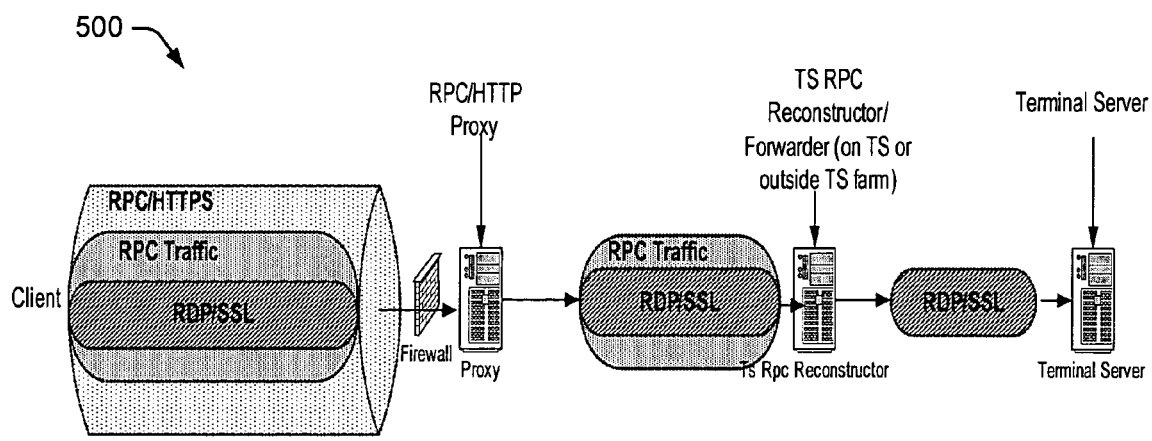
FIG. 5 illustrates an example of systems and methods involving the layering of protocols to move data between a server and client, wherein the data traverses a firewall and wherein layers are added and removed at different locations.

FIG. 5 shows a high-level overview 500 of proxy traffic between the client to the terminal server. The user-mode TS forwarder/RPC re-constructor is responsible for reads and writes to the Terminal Server listener port (e.g. port 3389) and handling RPC communication with the client. The reads/writes to terminal server are done through a socket connection using Winsock APIs. All RPC details are abstracted out in the RPC re-constructor and a high-level functionality is exposed to the forwarder.

The forwarder/re-constructor is a DLL that can live on the TS machine, typically having the socket connection to TS configured as a loop-back connection. In a TS farm where the terminal servers are load-balanced, forwarder/re-constructor can live outside the farm.

Note that the configuration 500 seen in FIG. 5 avoids a problem (data sent to an incorrect location) that may arise when the proxy is co-located on the final terminal server itself. In particular, the problem is avoided because the proxy has to open only one channel from itself to the terminal server, rather than two channels. Where co-location is employed, (e.g. in the configuration of FIG. 2), the terminal server load balancer can send different packets (RPC calls) to different terminal servers, thereby possibly misdirecting data. To help alleviate this problem, a separate computer set up in front of the TS farm may be configured to make one call to a terminal server in the farm to get the IP address of the machine. Assuming this IP address is visible outside the farm, all packets (RPC calls) now are explicitly sent to this IP address directly.

Figure 6:
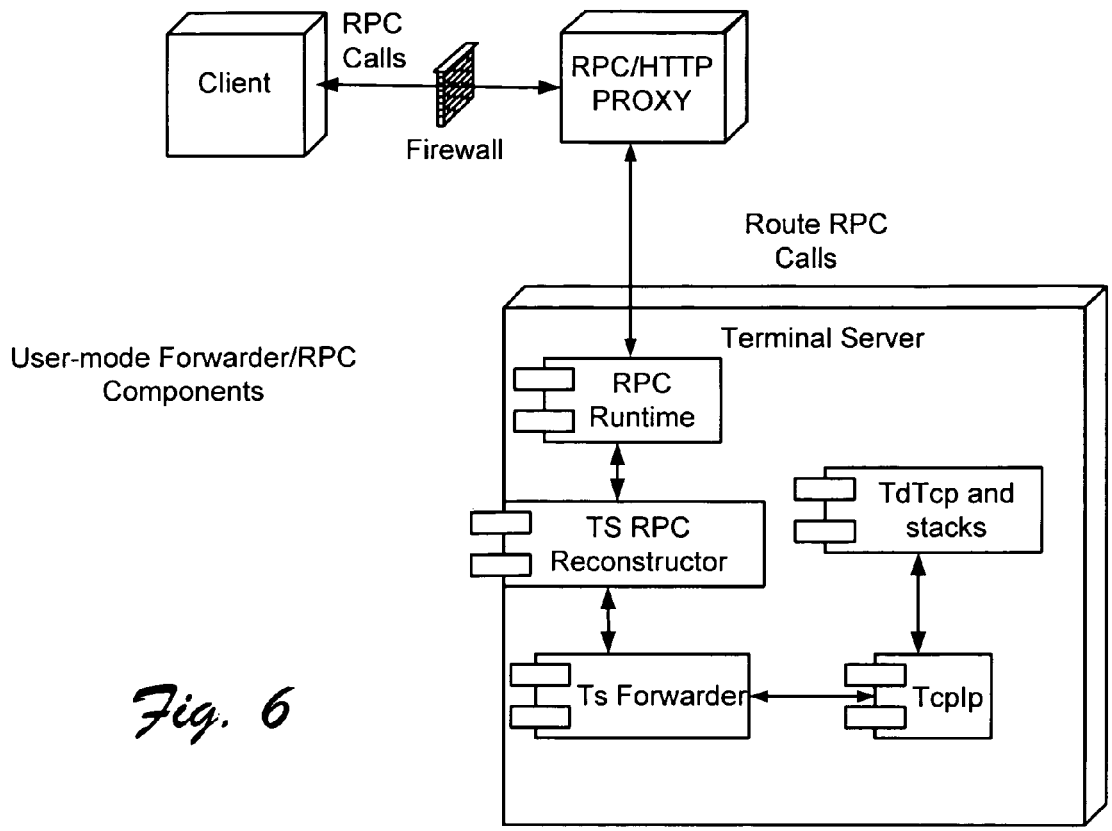
FIG. 6 illustrates an example of component-level structure of a user-mode forwarder.

FIG. 6 shows an exemplary component diagram for the user-mode forwarder, seen earlier in FIG. 5. The client (e.g. a Terminal Server client)-lives outside the firewall on the Internet. The client makes RPC calls that are routed to the RPC/HTTP proxy that lives in the corporation's DMZ inside the firewall (wherein the DMZ is a region between the firewall and an inner firewall). The RPC/HTTP proxy routes all the RPC calls to the real RPC server, which lives on the Terminal Server. For simplicity, this document generally refers to the RPC server on terminal server. However, in a TS farm implementation, the RPC server can also live outside the farm as a separate entity. Also, RPC server and RPC re-constructor are terms that are used interchangeably in the rest of this document. The RPC server may be configured as a DLL consisting of three main components, an RPC Runtime, an RPC re-constructor and a terminal server forwarder. The RPC Runtime (rpcrt4.dll) is an external OS component and is not TS-specific. The RPC re-constructor (tsrpcprx.dll) is configured to receive RPC calls and sends data to the client. It communicates with the forwarder to send and receive data to/from the terminal server. The TS Forwarder (tsrpcprx.dll) establishes a socket connection to a TS listener port (e.g., to loop-back port 3389). All data received from the RPC re-constructor is written to the socket and all data received from the socket is written to the RPC re-constructor. TCP/IP and TdTcp and stacks are existing components with which the forwarder communicates with over sockets.

Figure 7:
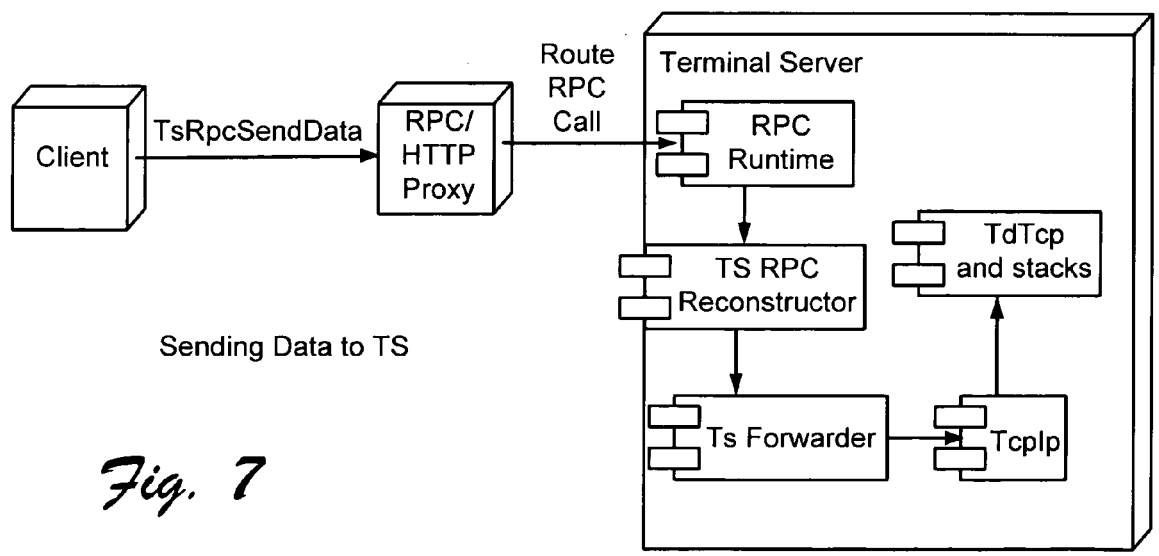
FIGS. 7 and 8 illustrate an example of sending and receiving data, respectively, in a multiple-asynchronous mechanism.
Figure 8:
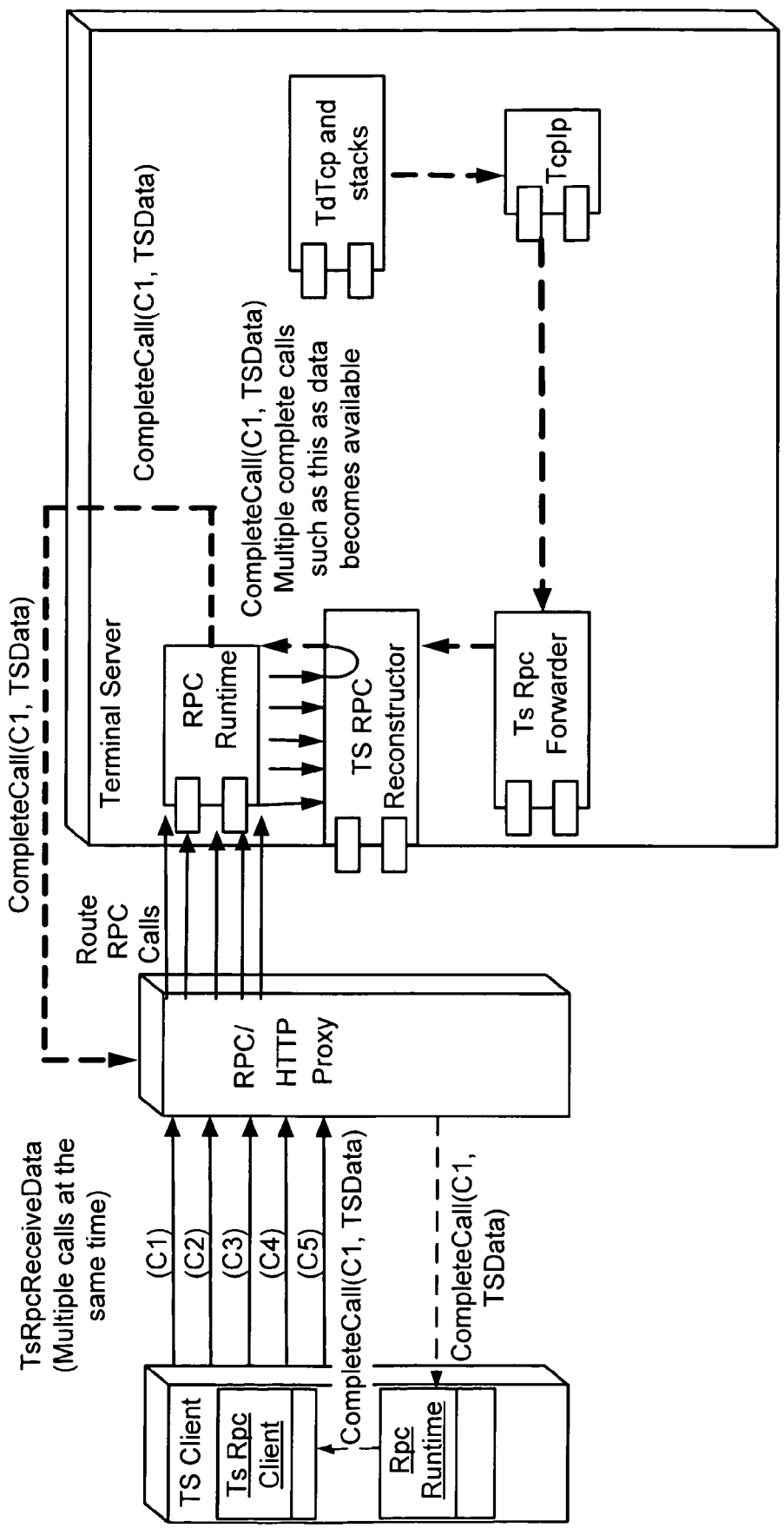
Figure 9:
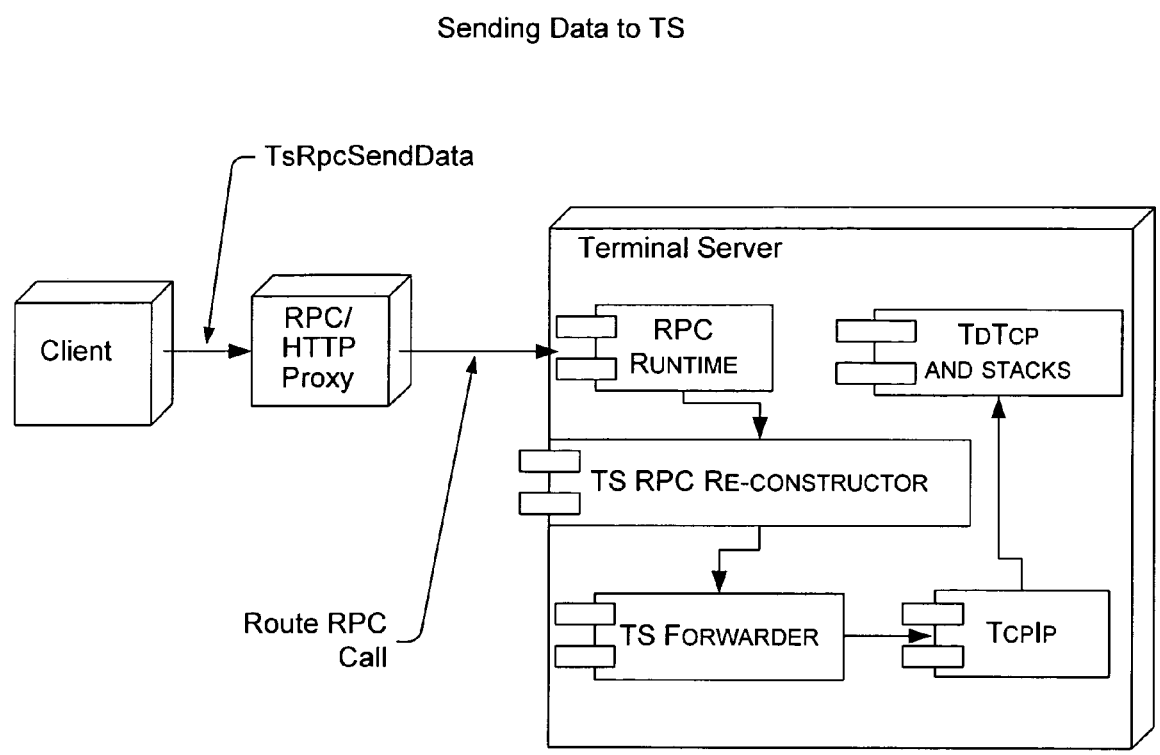
FIGS. 9 and 10 illustrate an example of sending and receiving data, respectively, in an asynchronous pipe mechanism.
Figure 10:
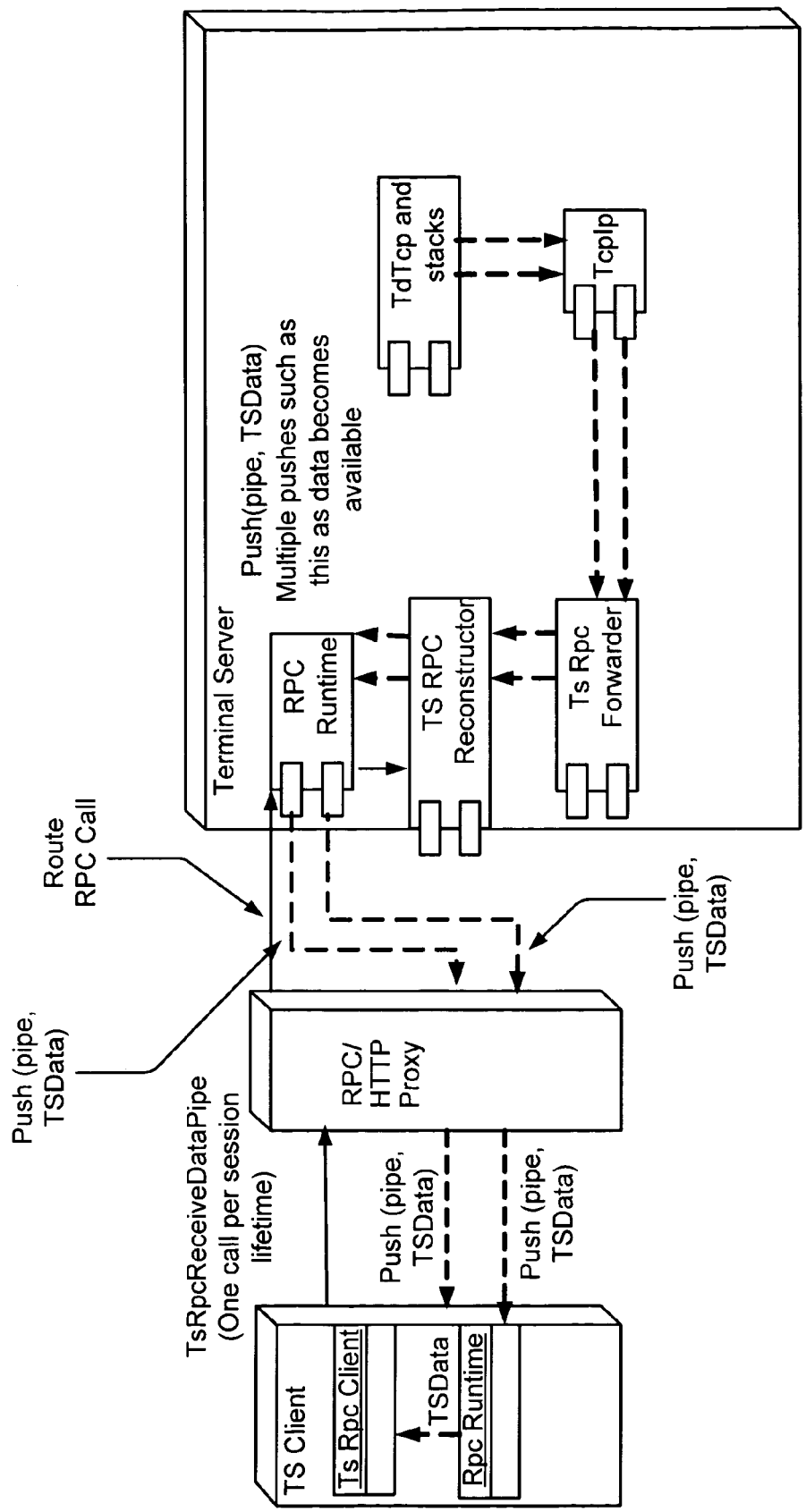

FIGS. 7-10 show two principle implementations for the RPC re-constructor. The RPC re-constructor is responsible for receiving RPC calls from the client and sending TS data back to the client via RPC. FIGS. 7 and 8 show an implementation wherein the RPC re-constructor is configured as a multiple-asynchronous mechanism, while FIGS. 9 and 10 show the re-constructor configured as an asynchronous pipe mechanism.

FIGS. 7 and 8 show structures associated with sending and receiving data, respectively. In the multiple-asynchronous mechanism, the client makes a series of asynchronous RPC calls to the RPC server in order to receive data from the terminal server in a manner consistent with the operation of RPC communication. The RPC server saves a list of these received calls, and as data becomes available from the terminal server, the RPC server completes each call in the order received. This has two methods as part of its interface:

TsProxySendToServer([in] DWORD dwNumBytes, [ref, in, size_is(dwNumBytes)] char *pBufferIn);

and also

TsProxyReceiveFromServerMultipleAsync([in] DWORD dwNumBytes, [out]DWORD *pdwNumBytes, [out] DWORD *sequenceNumber, [out, size_is(dwNumBytes), length_is(*pdwNumBytes)] char *pBufferOut).

The send method is easily understood. Data is sent to the terminal server via the RPC server whenever there is data that needs to be sent from client to server. There will be as many send calls as there are packets. The second method is used to receive data from terminal server. One parameter that is of interest in this method is the sequenceNumber. This parameter is used to indicate to the client the sequence number of the packets in the current packet order in which the packets are sent. Since packets may be delivered in an out of-order sequence by RPC run time on the client-side, the sequencing of the packets must be tracked. Other parameters are self-explanatory.

The client makes multiple calls on the send method. Each call is associated with a distinct RPC asynchronous handle that the server tracks, to send data back. The client ensures that there are at least a few outstanding calls to the server to receive data in order to reduce latency.

FIGS. 9 and 10 show structures associated with sending and receiving data, respectively, in the asynchronous pipe implementation. In this mechanism, the client makes send calls the same way as in the multiple-asynchronous mechanism, seen in FIGS. 7 and 8. The receive call, however, is a single call. The method may be implemented according to the following:

TsProxyReceiveFromServerAsyncPipe(handle_t binding, [out] CHAR_PIPE_TYPE* outPipe).

The outPipe is created by the RPC run time on the server side. The RPC server uses the outPipe and pushes data as it becomes available from the terminal server. There will be as many push calls as the number of packets. The advantage to this method is that it does not require multiple request calls to be made by the client in order to receive data, and therefore overhead is reduced. This method is well-suited to terminal server implementations. In some applications, this implementation requires an update to the RPC runtime library on both the client and server.

The client and server can negotiate whether to implement the embodiment of FIGS. 7 and 8 or the embodiment of FIGS. 9 and 10. The result of this negotiation typically depends on whether an updated RPC runtime is available. If an updated rpcrt4.dll is available on both client and server, they can choose to use the implementation of FIGS. 9 and 10, since this implementation is typically more efficient. If one of the ends do not have an updated rpcrt4, then can negotiate to use multiple-asynchronous implementation of FIGS. 7 and 8.

To perform the negotiation, the client first determines if an updated rpcrt4.dll is available on the client side. If it does not, it always implements multi-asynchronous, which would be supported by the server. If an update is available, the client makes an RPC call to the server to get a list of supported models and picks pipes if pipes is supported; otherwise uses the multi-asynchronous implementation.

Irrespective of the mechanism used by the RPC re-constructor, all data sent to client and received from client is typically performed in an asynchronous way so that RPC threads are not blocked and latency is reduced. To do this, the RPC server uses I/O completion ports supported by the RPC runtime. A dedicated thread for RPC I/O completions is started by the RPC server at startup. This thread handles all send and receive complete notifications from RPC and acts accordingly. The RPC re-constructor has an interface pointer to the TS forwarder whenever a new client connects. This pointer is used as long as the client is connected. When data is sent from the client, the re-constructor forwards it to the forwarder through the pointer. Similarly, when it completes sending data to the client, it notifies the forwarder that a send to client has been completed. When the re-constructor encounters any errors such as client disconnecting, it dispatches a disconnect call to the forwarder which disconnects the session.

Figure 11:
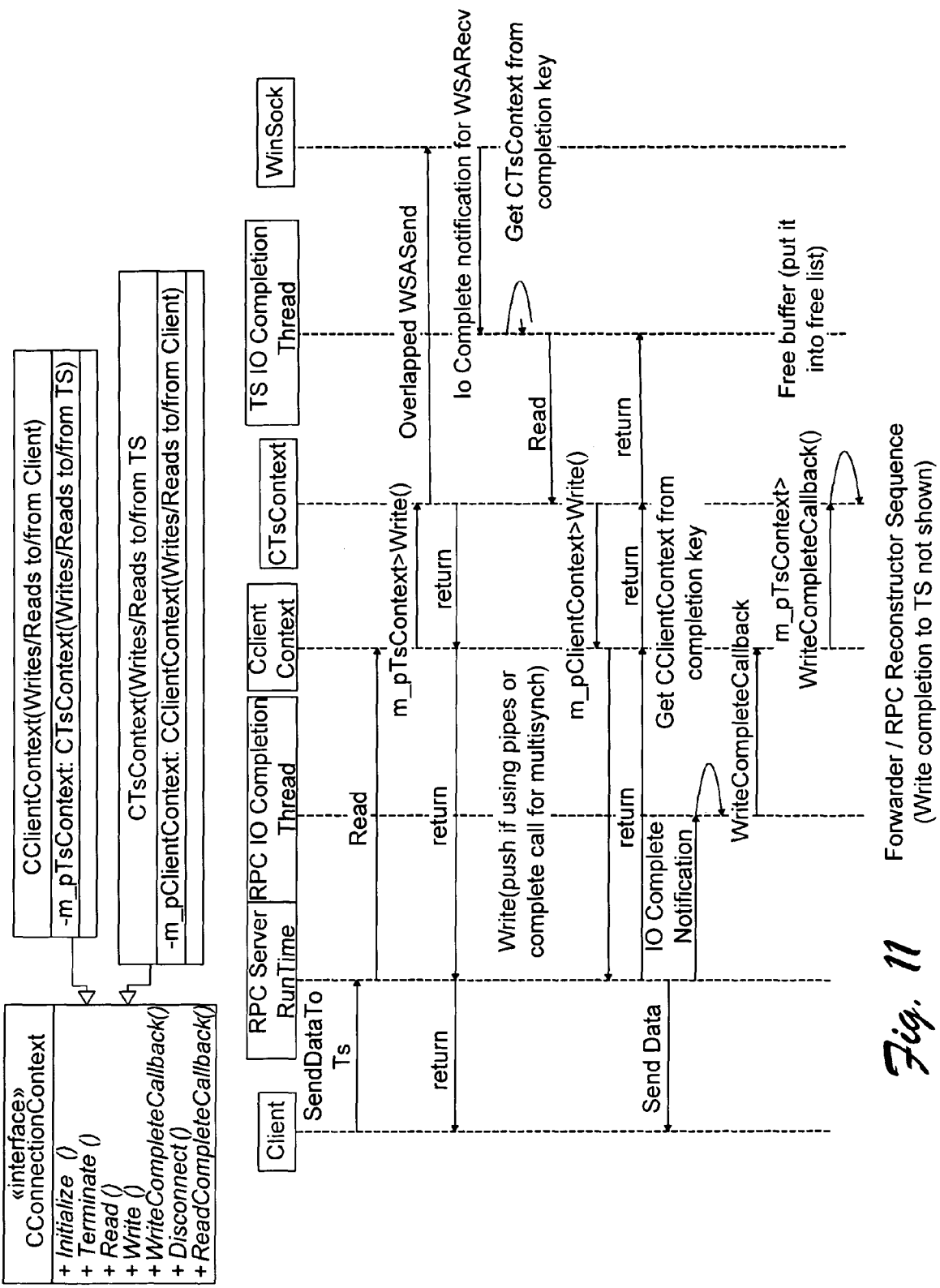
FIG. 11 illustrates exemplary details of the communication of the forwarder of FIGS. 6-9.

FIG. 11 shows details of the forwarder communication. The terminal server forwarder is responsible for sending/receiving data to/from the terminal server listener port. It uses overlapped Winsock socket connections, WSASend and WSARecv to send and receive data.

The data is sent and received using I/O completion ports similar to the RPC re-constructor. The RPC server starts an I/O completion thread at start up. This thread handles all the I/O completion callbacks for all socket connections. If needed, a thread pool can be used to do these operations.

The forwarder has an interface pointer to the RPC re-constructor when a new client connects. This pointer is used as long as the client is connected. When data is received from the terminal server, the forwarder forwards it to the re-constructor through the pointer. Similarly, when it completes sending data to the terminal server, it notifies the re-constructor that a send to terminal server has been completed. When the forwarder encounters any errors, such as in sending/receiving, it dispatches a disconnect call to the re-constructor which disconnects the client.

Figure 12:
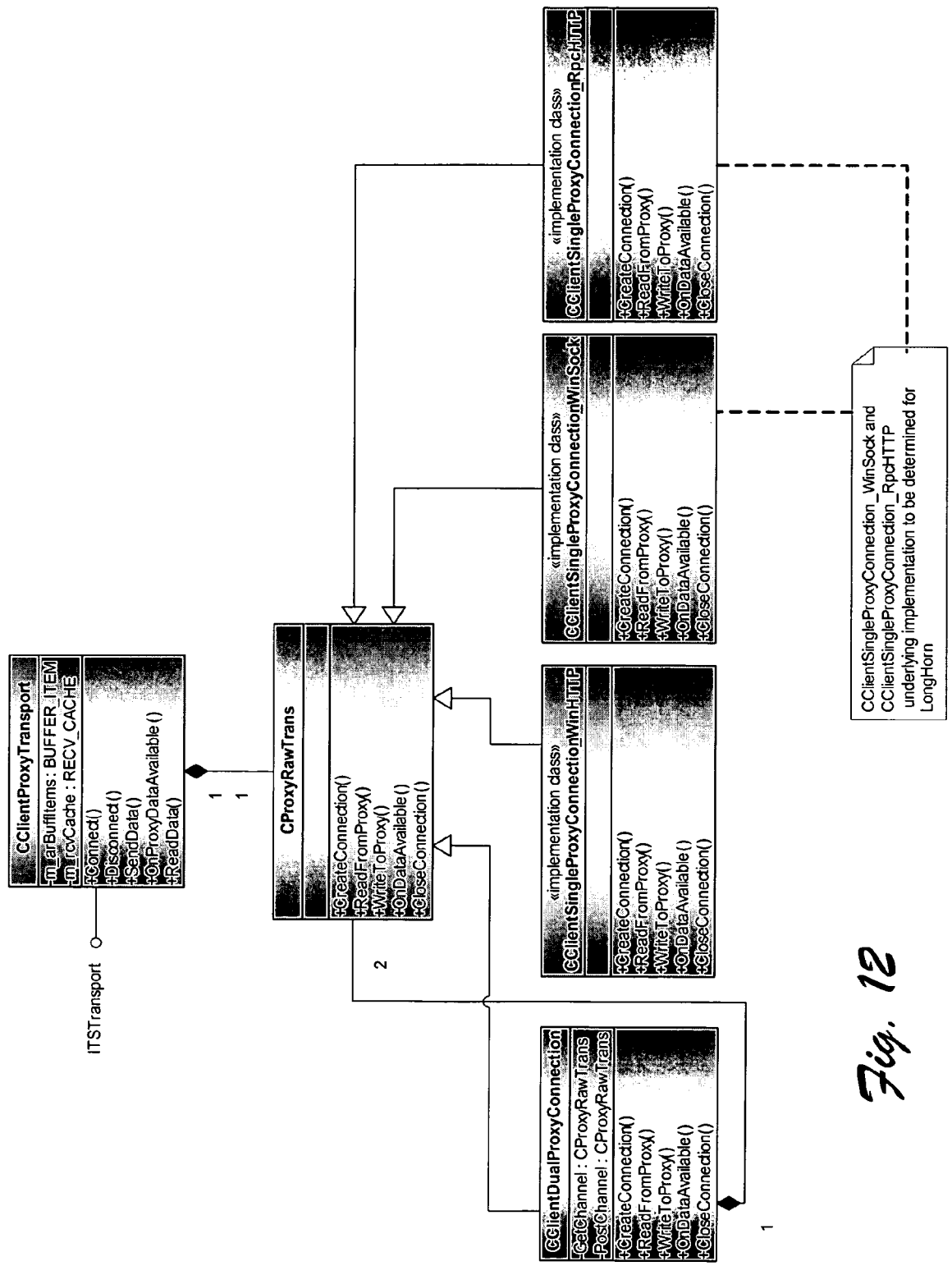
FIG. 12 illustrates an example implementation of the client's extensible architecture.

FIG. 12 shows the client's extensible architecture by dropping in an RPC transport (proxy_plugin.lib) configured to allow the client to forward RDP packets in RPC calls over HTTPS. In particular, the forwarder/RPC re-constructor sequence is shown (write completion to terminal server is not shown in this view). For every new session, the proxy will query a database to extract the user's capabilities and this information is sent to the terminal server. During a session connect the user capabilities are enforced.

Continuing to refer to FIG. 12, an overview on the class methods is revealed. The CClientProxyTransport includes several methods, including: Connect, Disconnect, SendData, OnProxyDataAvailable and ReadData. Connect establishes a channel to the proxy, authenticates and completes authorization. Disconnect notifies CProxyRawTrans to disconnect from the proxy. SendData forwards data from the transport stack to CProxyRawTrans object. OnProxyDataAvailable is called when data is available from the proxy. ReadData is called when transport stack needs RDP data. CProxyRawTrans includes several methods, including CreateConnection, ReadData, WriteData and OnDataAvailable. CreateConnection establishes a secure HTTP connection to the proxy. ReadData is called when internal cache is depleted and transport stack is informed that data is available at the network layer. WriteData is called when transport needs to forward data to the proxy. OnDataAvailable called when network layer notifies the channel that data is pending to be read. CloseConnection is a proxy initiated action when terminal server disconnects.

Figure 13:
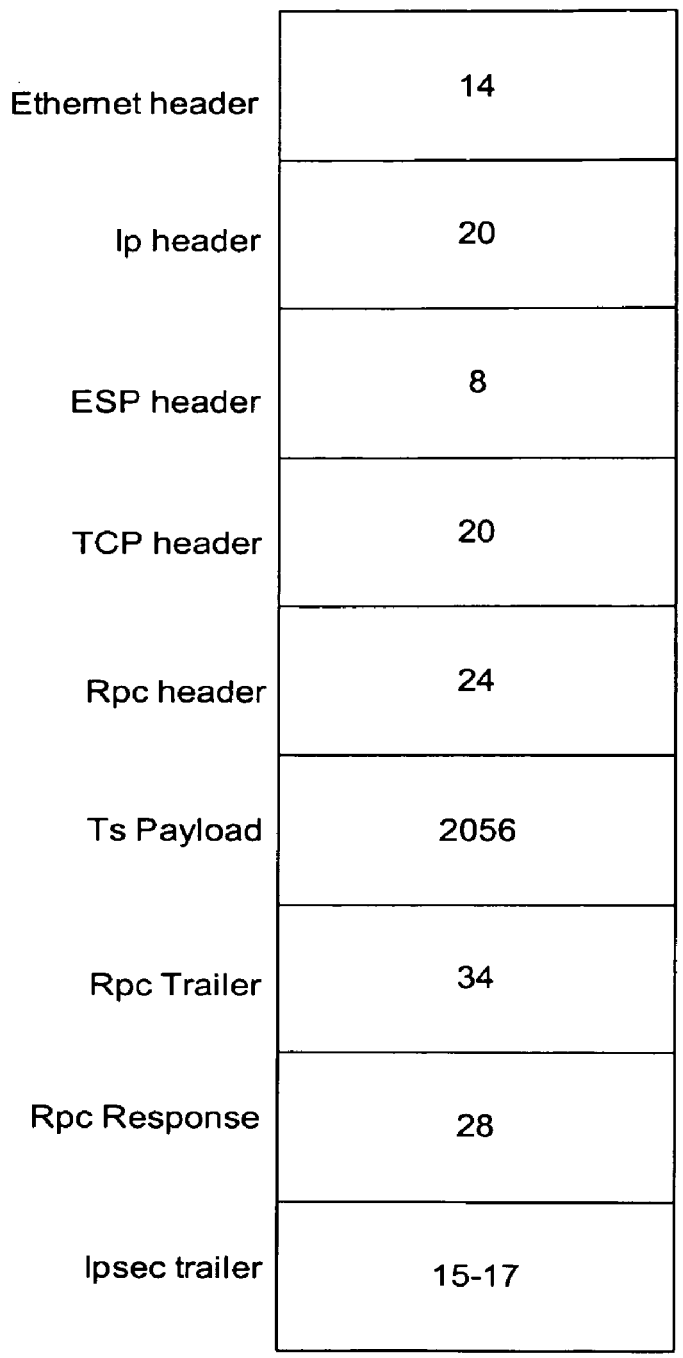
FIG. 13 illustrates exemplary overhead using RPC (without RPC/HTTP) proxy.

FIG. 13 shows a performance run to determine packet and bytes overhead was run using RPC (without RPC/HTTP) proxy. FIG. 13 reflects conditions wherein the client sent 10 packets of 2 k bytes of data each to the server. FIG. 13 shows a breakdown of the packet bytes for this run. As seen in FIG. 13, the net overhead for sending data from client to server is approximately 86 bytes per packet, which is roughly equal to 4% of the payload.

Figure 14:
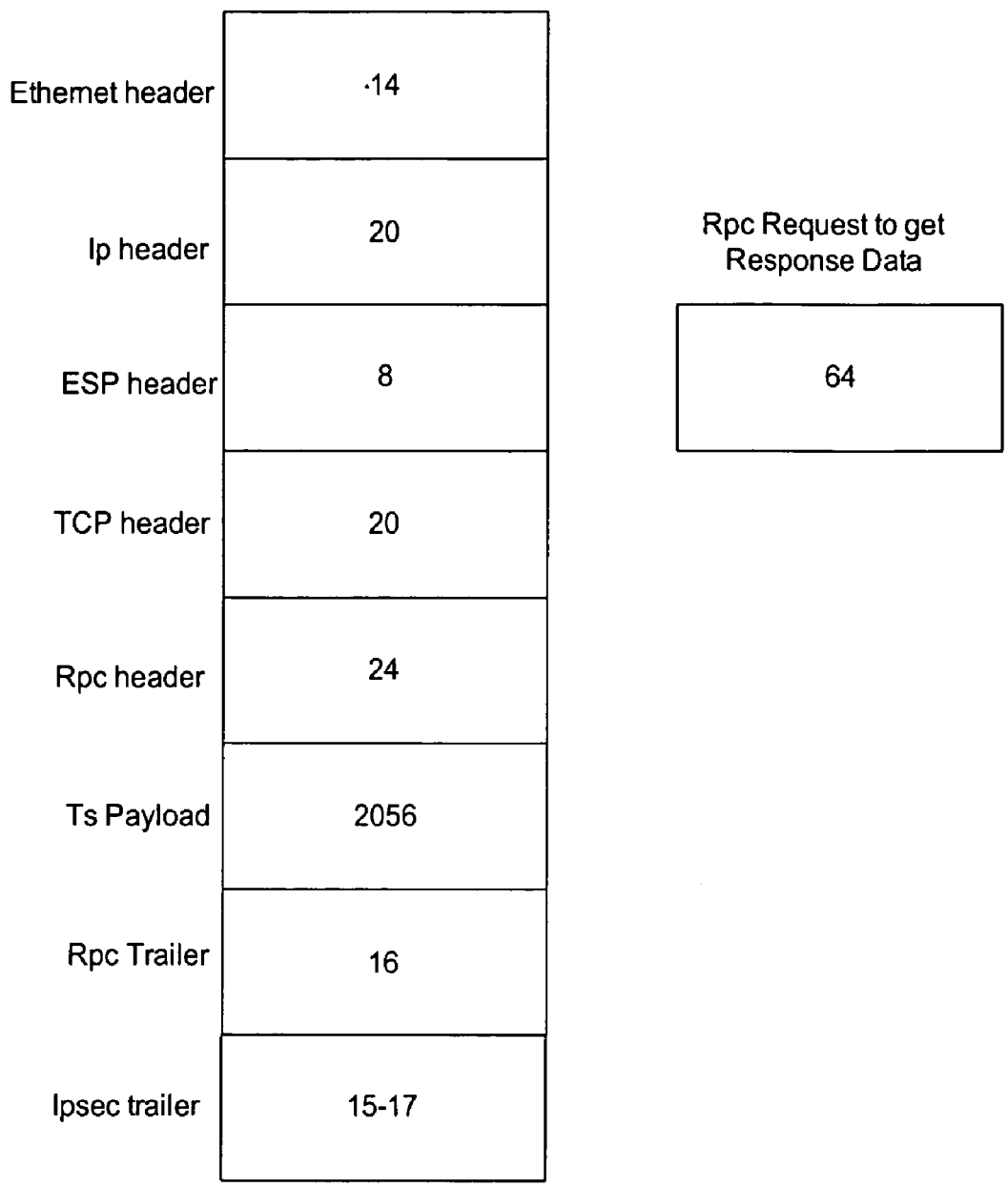
FIG. 14 illustrates exemplary overhead using RPC (without RPC/HTTP) proxy with a multi-asynchronous model.

FIG. 14 shows a performance run to determine packet and bytes overhead was run using RPC (without RPC/HTTP) proxy with multi-asynchronous model. FIG. 14 reflects conditions wherein the server sends 10 packets of 2 k bytes of data each to the client. The client initially posts five outstanding asynchronous requests to the server and subsequent times waits until the outstanding requests deplete to 1 before posting four more requests. FIG. 14 shows a breakdown of the packet bytes for this run. As seen in FIG. 14, the net overhead for sending data from client to server is approximately 104 bytes including the asynchronous request bytes. This is roughly equal to 5% of the payload.

Figure 15:
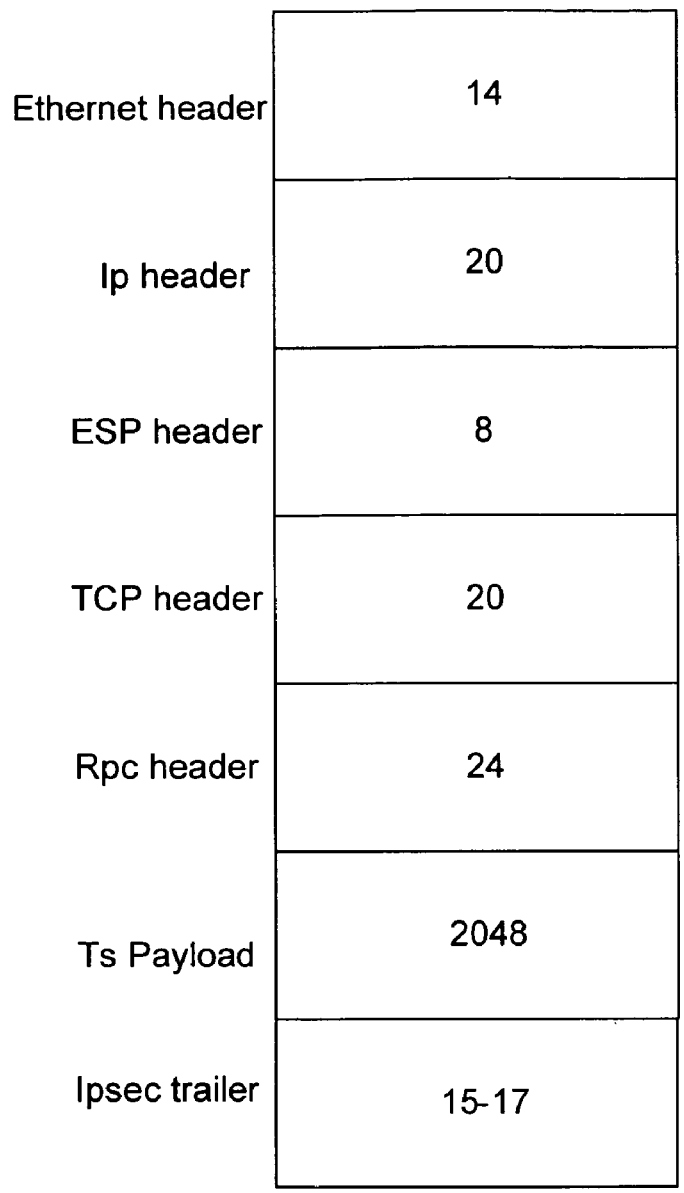
FIG. 15 illustrates exemplary overhead using RPC (without RPC/HTTP) proxy with asynchronous pipe model.

FIG. 15 shows a performance run to determine packet and bytes overhead was run using RPC (without RPC/HTTP) proxy with asynchronous pipe model. FIG. 15 reflects conditions wherein the server sends 10 packets of 2 k bytes of data each to the client. The client makes only one initial request and pulls data as it becomes available. FIG. 15 shows a breakdown of the packet bytes for this run. As seen in FIG. 15, the net overhead for sending data from client to server is approximately 24 bytes for this model. This is roughly equal to 1% of the payload. From the performance runs, it is clear that the asynchronous pipe model is much higher performing than the multi-asynchronous model.

Some performance optimizations are available for use in the multiple-asynchronous model. For example, eliminating the response bytes for the requests and piggy backing on them to receive data may increase performance. However, this will increase code complexity. Additionally, modifying the RPC runtime so that one asynchronous request can specify multiple asynchronous requests that the server will clone may increase performance. Further, modifying the interface methods to eliminate returning error status, and modifying some of the semantics of the asynchronous calls may increase performance.

Figure 16:
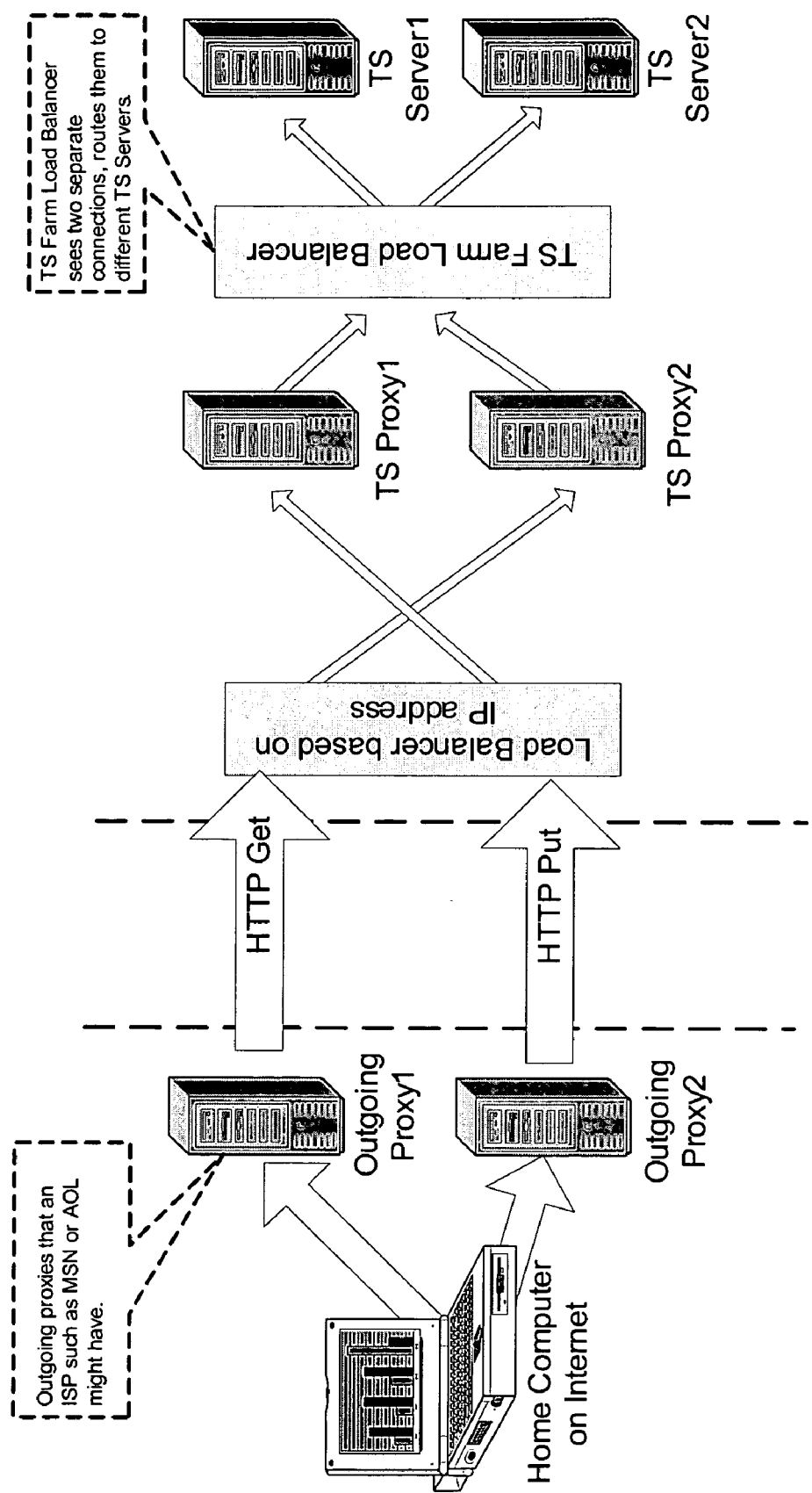
FIG. 16 illustrates a problem associated with RPC/HTTP's use of two channels to transmit data, wherein a load balancer may mistakenly route data to incorrect proxy servers.

FIG. 16 shows that for any DUAL-channel proxy implementation, where the Get and Put are coming in on separate channels, a general problem exists when working with TS farms. The problem arises when more than one proxy servers are deployed and load-balanced. FIG. 16 actually illustrates two separate problems. A first problem is that, from the TS Farm Load Balancer's perspective, two separate connections are made (Get and Put channels). Each of these connections may be load-balanced to a different server within the TS farm. Therefore, the RDP communication will never properly begin, since only one of the two necessary channels arrives at each TS Server. A second problem (that arises only where the proxy logic is co-located on the terminal server, such as in the implementation of FIG. 2) is that the RPC/HTTP proxy uses RPC to communicate to the TS Server, so a TS load-balancer may not be configured to properly load-balance non-RDP connections (typically to port 3389 TCP/IP).

There are there are three basic classes of solutions to the problem associated with TS farms. In one solution, the RPC Re-constructor/Forwarder Service is moved in front of the TS Farm's load-balancer. This solution will typically accommodate small- to medium-sized businesses. In a second solution, each machine in the TS Farm is made addressable by the RPC/HTTP proxy, and a simple load-balancing mechanism is created for proxy connections. In a third solution, an attempt may be made to perform load-balancing as a general feature to RPC/HTTP.

Figure 17:
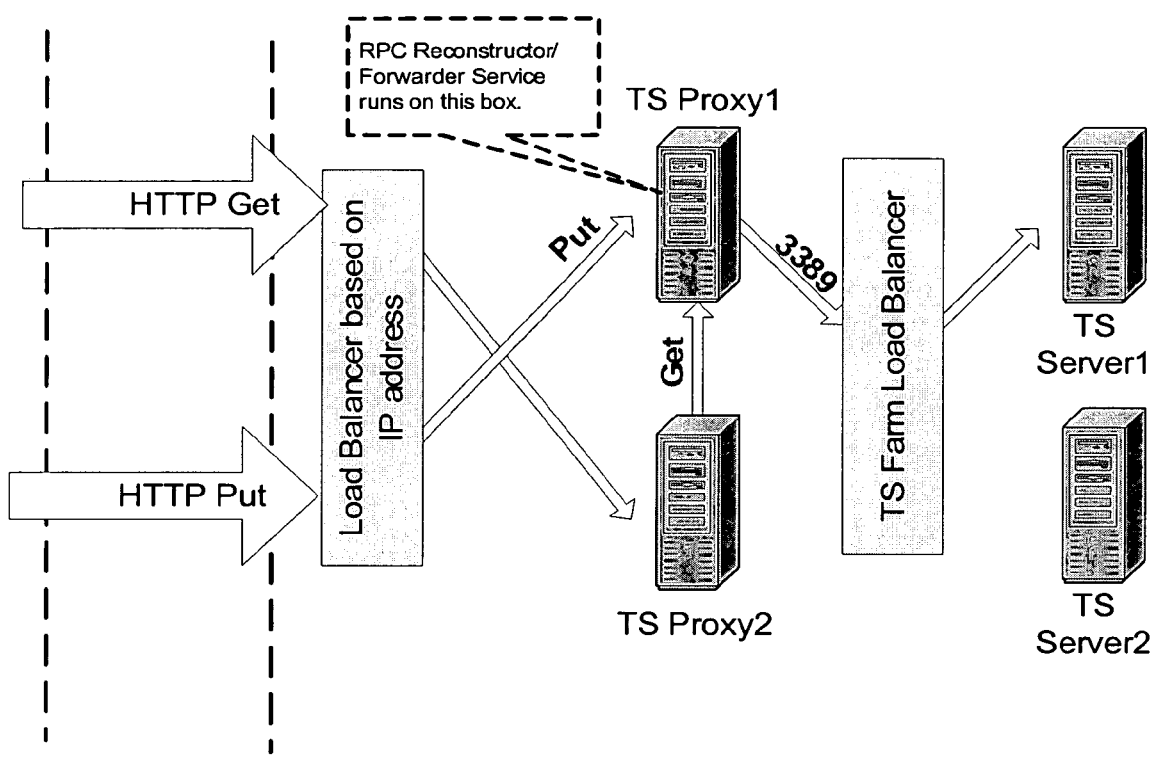
FIG. 17 illustrates a the first solution to the problem of FIG. 16, wherein the RPC Re-constructor/Forwarder Service is moved in front of the TS Farm's load-balancer.

FIG. 17 shows an implementation of the first solution, wherein the RPC Re-constructor/Forwarder Service is moved in front of the TS Farm's load-balancer. This is by far the easiest solution to implement that would alleviate the problem of the proxy working with a TS Farm. In this implementation, the RPC Re-constructor/Forwarder service is not placed on each Terminal Server in the farm; instead, this service is running on a different server in front of the farm. Several options are available. In a first option, the re-constructor service runs on an RPC/HTTP proxy box. A possible disadvantage of this configuration is that multiple load-balanced proxies now have traffic that is being forwarded between them (to ensure that the Get and Put channels can be reconstructed). In a second option, the re-constructor service is on a new server inside of the corporation (not in the DMZ, i.e. between firewalls). This server would act as the point where Get and Put channels are combined. A possible disadvantage to this is that a new server is required. In a third option, the re-constructor service runs on the TS Session Directory machine.

In the implementation of FIG. 17, the Get and Put channels are now reconstructed before the stream gets to the TS Farm, and the TS Farm's load-balancer is simply getting a standard RDP connection. A possible downside to moving the RPC Re-constructor/Forwarder service off the target Terminal Server is that the traffic must be forwarded through yet another machine.

More particularly, FIG. 17 shows an implementation wherein the RPC re-constructor/Forwarder is running on the same box as an RPC/HTTP Proxy. The advantage to this solution is that it works in all configurations of the TS Proxy. The disadvantage is that one of the HTTPS channels must make an extra "hop."

Figure 18:
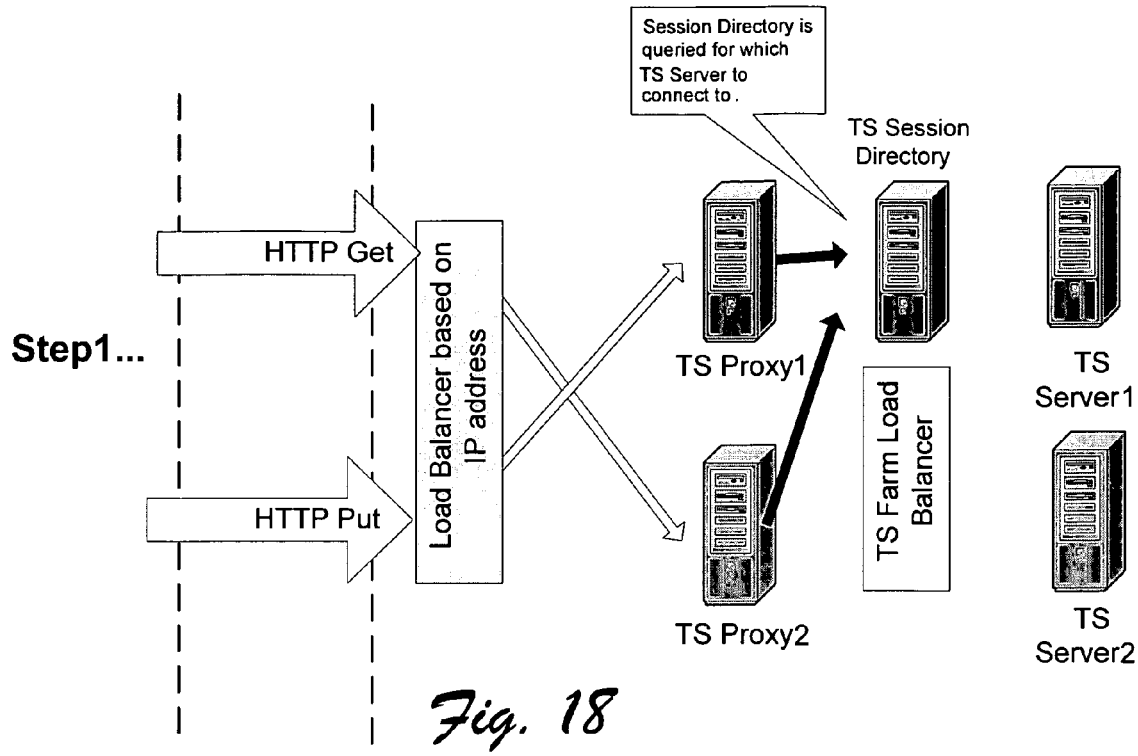
FIGS. 18 and 19 illustrate an implementation of the second solution to the problem of FIG. 16, wherein each machine in the TS Farm is made addressable by the RPC/HTTP proxy, and a simple load-balancing mechanism is created for proxy connections.
Figure 19:
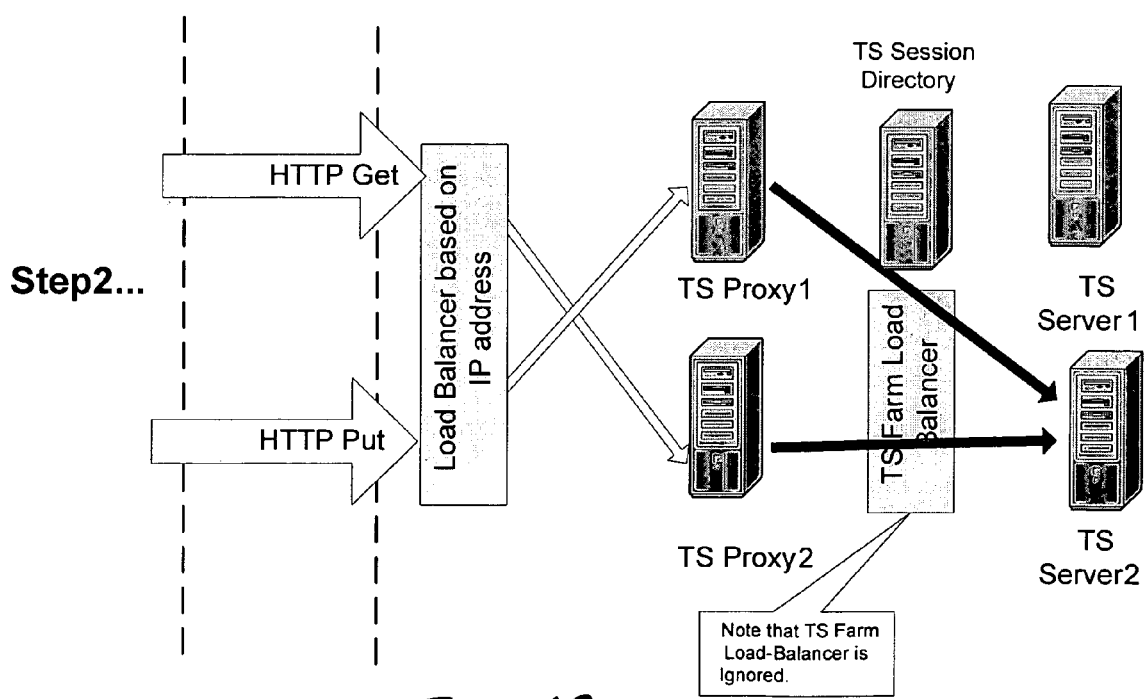

FIGS. 18 and 19 show an implementation of the second solution, wherein each machine in the TS Farm is made addressable by the RPC/HTTP proxy, and a simple load-balancing mechanism is created for proxy connections. This solution involves exposing the IP addresses of terminal servers in the farm to the RPC/HTTP proxies; accordingly, the second class of solution involves making the Terminal Servers in a TS Farm individually addressable to the RPC/HTTP proxies.

One way to accomplish this is to create a new HTTP/RPC Service that runs on the TS Session Directory. Thus, the Session Directory, in addition to each machine within the TS Farm, must be addressable by the Proxies.

The TS Client would first connect directly to the Session Directory machine through HTTP/RPC. This is easy to setup, as the RPC/HTTP proxy can allow machine-name translation from a farm's virtual IP to the specific machine that the Session Directory is running on (through the RPC/HTTP Redirector facility). The new service would have a method to query to which machine a reconnection should be made. The logic for this service would simply be to look up the user's existing sessions in the farm and if there is no session to do a simple round-robin load-balancing.

Once the TS Client discovers the name of the particular machine to which to connect, it fully disconnects and reconnects to the discovered machine, and begins the session.

The advantage to this solution is that the RPC Re-constructor/Forwarder runs on the target Terminal Server, so that performance is maximized (because the Get and Put channel do not need to be forwarded to a separate machine). The disadvantage is that it potentially requires a company to change the way that their TS Farm is configured by making the individual Terminal Servers addressable by the Proxies.

With respect to the third solution, an attempt may be made to perform better load-balancing as a general feature to any RPC/HTTP implementation.

Configuring Individual Components

In one implementation, the URI will specify the location of the RPC-proxy. RDP fields that are pertinent to the proxy client plug-in are seen in the below table.

|  | Regular RPC (values) | RPC over HTTP (values) |
| --- | --- | --- |
| Full address: | Full DNS name of tserver | Possibly a GUID to resource |
| Proxy mode: | Zero for TCP transport one for RPC transport | One for RPC-transport |
| Proxy URL: | Value is ignored | URL to webserver to accept RPC over HTTP |

In order to specify the RPC-mode of communication (mulitple asynchronous, asynchronous pipe or one RPC) one must set a regkey in order for the client and server to instantiate the appropriate class. On the client machine set HKCU\Software\Microsoft\Terminal
Server\RpcProxy\ClientPipeType (DWORD)
0—Multiple Asynchronous.
1—Asynchronous Pipe.
2—One RPC.

Not setting this key defaults to Multiple Asynchronous (0).

Additional information may be useful when configuring computers for RPC over HTTP. To use HTTP as a transport protocol for RPC, RPC Proxy running within Internet Information Server (IIS) must be configured on the server program's network. The following passage describes configuration options.

In a Windows® environment, IIS must first be installed on the machine running the RPC Proxy. Once IIS is installed, the RPC Proxy is installed. Both IIS and the RPC Proxy can be installed simultaneously from Add/Remove Windows® Components in the Control Panel. RPC Proxy is installed from Networking Services, and is called RPC over HTTP Proxy in Windows® setup. If both IIS and RPC Proxy are installed at the same time, Windows® ensures they are installed in the proper order.

After installation of the RPC Proxy, some additional configuration tasks must be performed. First, open the IIS MMC snap-in and configure the RPC Proxy virtual directory to require security, as explained in RPC over HTTP Security. This step is required only if you plan to use RPC over HTTP v2. Second, if IIS does not have a certificate installed, a valid certificate must be obtained and installed for that computer in order to use SSL when communicating with the RPC Proxy. This step is relevant only for RPC over HTTP v2. Third, set the ValidPorts key as described in RPC over HTTP Security. When these configuration tasks are completed, the RPC over HTTP proxy is ready to forward requests from the RPC over HTTP client to the RPC over HTTP server.

The RPC/HTTPS Dual-Channel Implementation

The HTTPS Dual-Channel solution is a preferred embodiment. However, the dual-channel HTTPS introduces a difficult problem: at some point in the chain after the proxies, the Get and Put channels need to be reconstructed into a single full-duplex stream. If the Get and Put channels always arrived at the same exact proxy server, this would not be difficult. However, as soon as the two channels are split onto separate proxy servers, reconstructing the two channels implies inter-machine communication (forwarding of the traffic).

Figure 20:
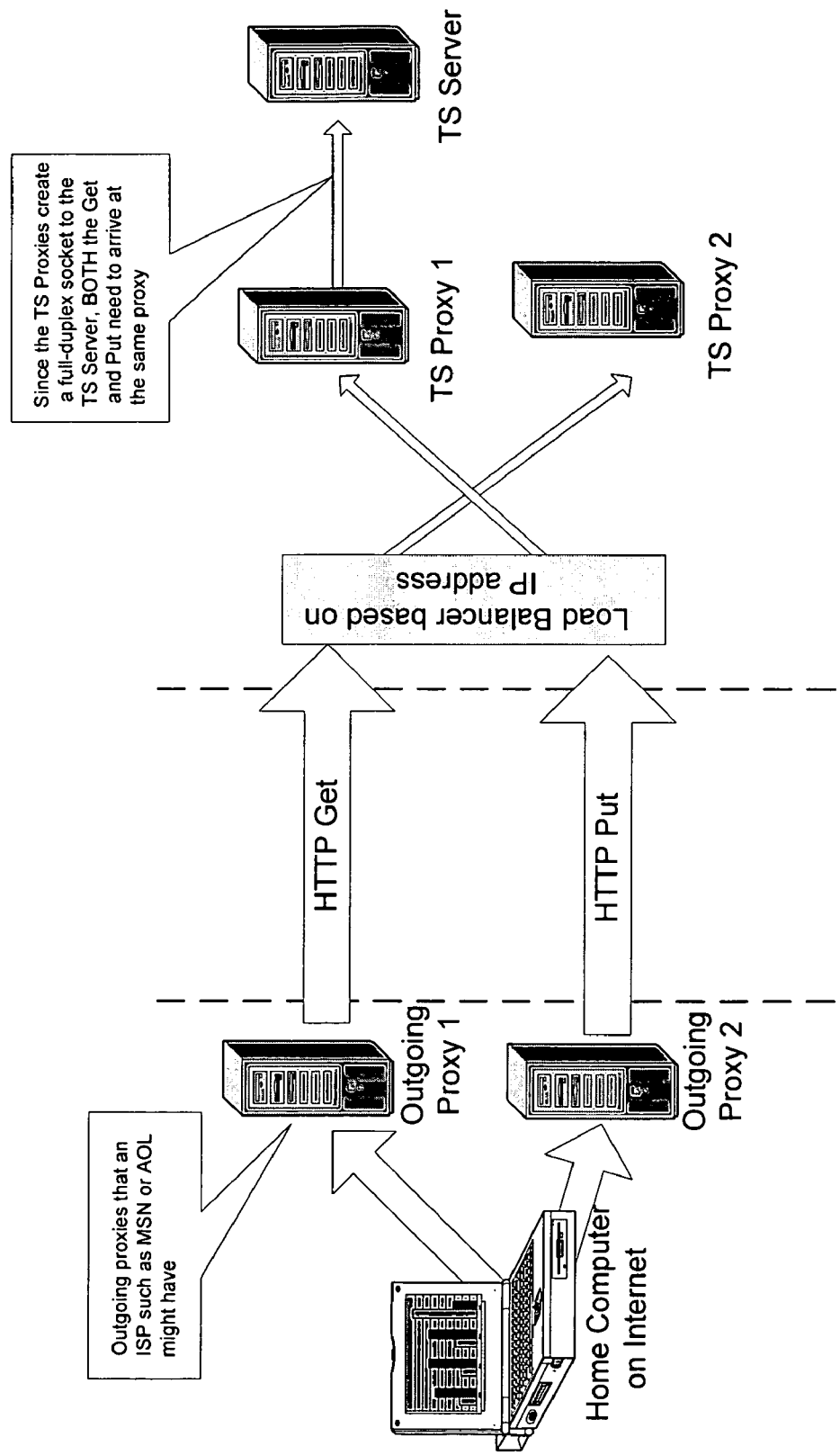
FIG. 20 illustrates an exemplary implementation of the RPC/HTTPS dual-channel implementation.

FIG. 20 shows aspects of this problem by illustrating that home computers are in fact behind outgoing proxies that ISPs provide. Thus, a Get and Put request are actually quite likely to appear as different IP addresses to the load-balancer.

Get and Put may be sent to different proxy servers because a corporation (or other entity) can definitely deploy more than one proxy for scalability reasons (behind their firewall). The problem with this is with the load-balancer logic that sits in front of the proxies. If it is doing simple round-robin load-balancing, then the Get and Put channels are not guaranteed to arrive at the same proxy.

A simple work-around to this could be to require IP-affinity to be turned on at the load-balancer, such that all client connections with the same IP address are routed to the same proxy. This has two problems. First, turning on IP affinity is not acceptable for many corporate deployments that do not use IP-affinity today. The second issue is that IP-affinity will only help if the IP address of the client is the same for the Get and Put channels. It is not the same in the case shown by FIG. 20.

A second work-around (besides IP-affinity) would be to serialize the connection of the two channels. For instance, the Get channel could fully connect through the load-balancer to a particular proxy server. Then, a special message could be sent back on this channel to the client contain the IP address of the particular proxy (rather than the load-balancer IP address). The client could then initiate the connection for the Put channel, and make it directly to the proxy IP address. This work-around is unacceptable in some applications since it would require all proxy-servers to have their IP addresses visible to the Internet (not good because of the cost of additional IP addresses and the information disclosure).

Because the Get and Put channels cannot be forced to arrive on the same proxy server, the traffic needs to be merged from the two channels in some fashion by forwarding the traffic from both channels to a particular server. As seen in the above discussion, the RPC re-constructor/forwarder server can perform the merging. The RPC re-constructor/forwarder can be configured as the target terminal server, one of the proxy servers, or a new server. In operation, the RPC/HTTP server deals with dual-channels by reconstructing the RPC at the target service.

Exemplary Embodiment

Figure 21:
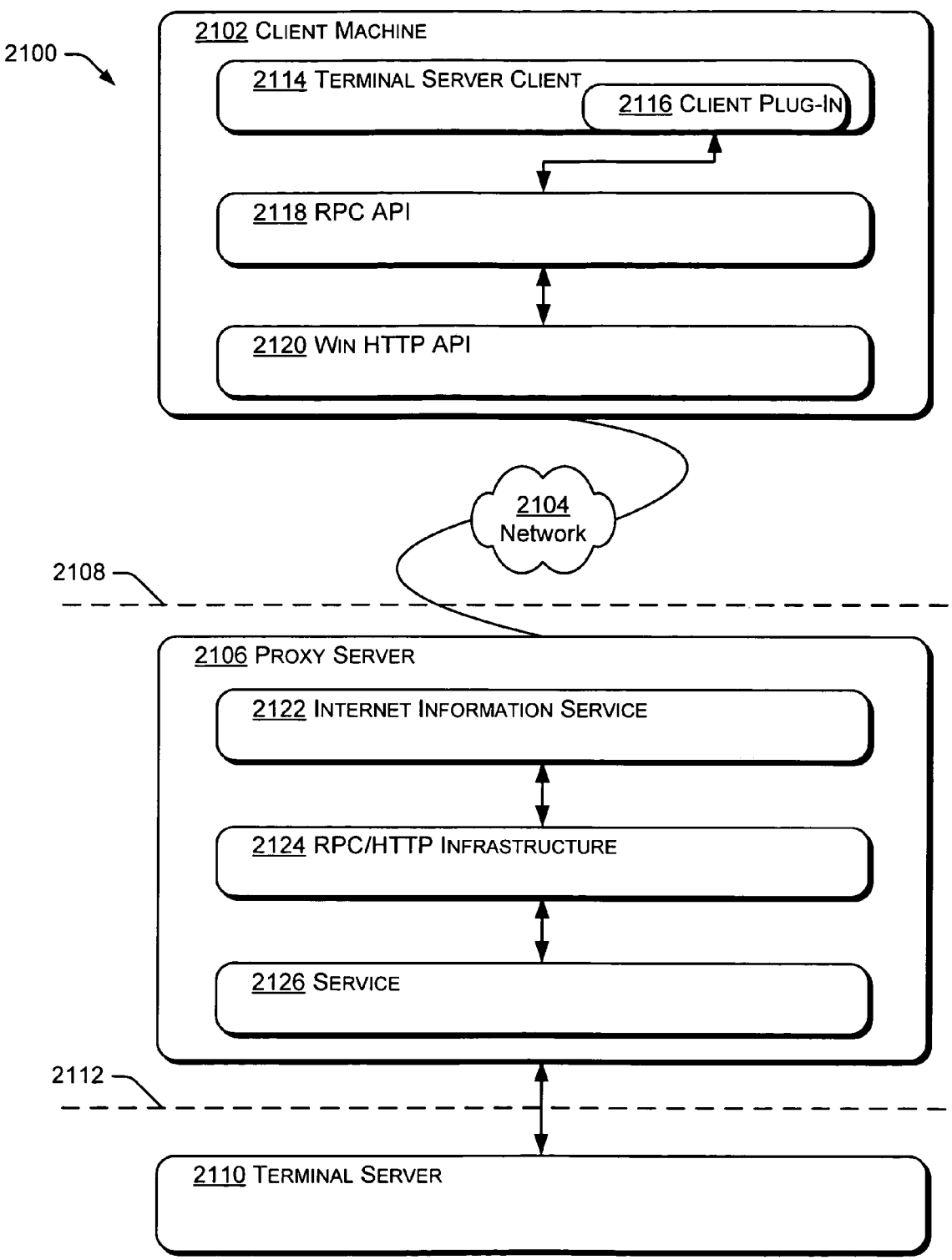
FIG. 21 illustrates an exemplary embodiment configured for enabling terminal services through a firewall.

Referring to FIG. 21, an exemplary embodiment of a system 2100 configured for enabling terminal services through a firewall is seen. A client machine 2102 uses a network 2104, such as the Internet, to communicate with a proxy server 2106 behind a firewall 2108. The proxy server 2106 routes data to and from a terminal server 2110, on which the client machine 2102 has an open session. In the exemplary embodiment of the system 2100, a second firewall 2112 is between the proxy server 2106 and the terminal server 2110. Accordingly, the proxy server 2106 is located in a DMZ between firewalls 2108 and 2112.

The client machine 2102 has a terminal server client process 2114 running. The terminal server client 2114 is configured to include a client plug-in 2116. The plug-in 2116 is configured to wrap RDP (remote desktop protocol) that is native to the terminal server client with RPC (remote procedure call). (In a non-Windows® environment, a client protocol could be used in place of RDP.) The plug-in 2116 is configured to access the RPC API 2118, and to pass and receive RPC-wrapped data.

In response to the plug-in 2116, the RPC API 2118 accesses the Win HTTP API 2120. The Win HTTP API 2120 is configured to wrap (or unwrap, when reading data) the RDP/RPC with HTTPS. The resultant RDP/RPC/HTTPS is configured to move over the network 2104, through the firewall 2108, and to the proxy server 2106.

The proxy server 2106 has an Internet information service 2122 configured to strip off the HTTPS protocol from the incoming data configured as RDP/RPC/HTTPS. An RPC/HTTP infrastructure 2124 is configured to strip off the RPC protocol, leaving the in-coming data configured in an RDP protocol. The RDP-wrapped data is passed to the service 2126.

The RPC re-constructor/forwarder service 2126 is configured to re-construct the incoming packets, i.e. to organize them in their appropriate order. The service 2126 could be constructed according to FIGS. 2-20, and in particular with respect to the discussion of FIGS. 17-20. The service also forwards data to a correct terminal server 2110 from among those available. Accordingly, the client plug-in 2116 and service 2126 allow the terminal server client 2114 to open a session on the terminal server 2110, and to access data and utilize applications according to the user's permissions. In a preferred embodiment, the service 2126 is configured to send and receive data according to an asynchronous pipe mechanism, although another mechanism, such as a multiple-asynchronous mechanism could be substituted.

Data transmitted from the terminal server 2110 to the terminal server client 2114 follows the reverse of the above-described path. Data leaving the terminal server 2110 is received by the service 2126, which is in communication with the client plug-in 2116 running on the terminal server client 2114. The data moves to the RPC/HTTP infrastructure 2124, where it is wrapped in RPC protocol. The data is then wrapped in HTTPS protocol at the Internet information service 2122. Configured according to RDP/RPC/HTTPS, the data moves through the firewall 2108 and over the network 2104. Arriving in the client machine, the HTTP API 2120 removes the HTTPS protocol. The RCP API 2118 communicates with the client plug-in 2116, which strips off the RPC protocol, allowing the terminal server client 2114 to process data in its native RDP protocol.

Exemplary Methods

Exemplary methods for implementing terminal services through a firewall will now be described with primary reference to the flow diagrams of FIGS. 22-24. The methods apply generally to the operation of exemplary components discussed above with respect to FIGS. 2-20, and particularly to FIG. 21. The elements of the described methods may be performed by any appropriate means including, for example, hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, a rewritable compact disc (CD-RW), and a portable compact disc read-only memory (CDROM).

Figure 22:
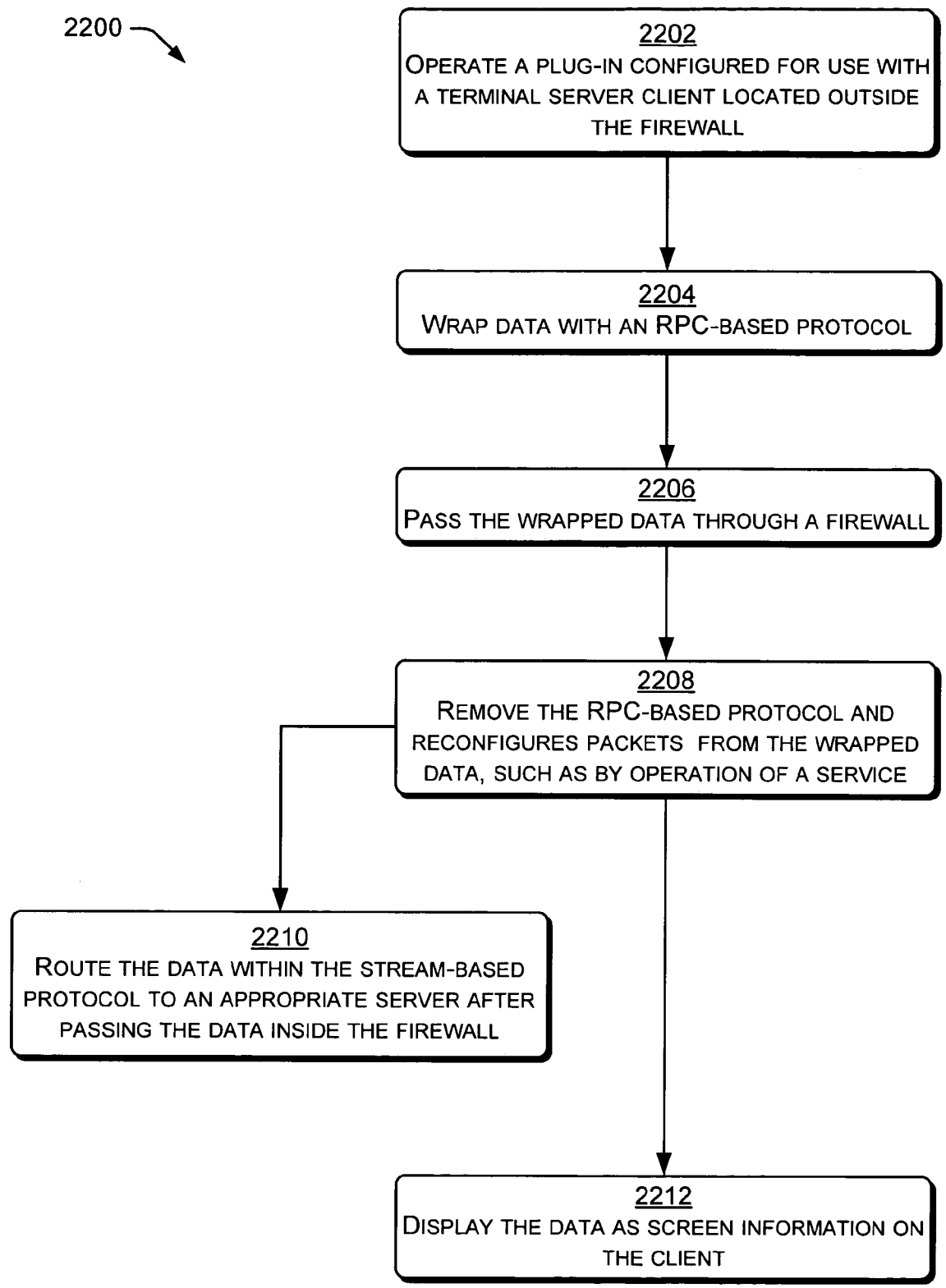
FIG. 22 illustrates an exemplary embodiment for implementing terminal services through a firewall.

FIG. 22 shows an exemplary method 2200 for enabling terminal service through a firewall. At block 2202, a terminal server client and associated plug-in are operated. In the typical implementation of FIG. 21, the plug-in 2116 and terminal server client 2114 are located outside the firewall 2108.

At block 2204, data is wrapped with an RPC protocol. In the example of FIG. 21, the plug-in 2116 is configured to wrap the native RDP (remote desktop protocol) of the terminal server client 2114 with RPC (remote procedure call) protocol, thereby resulting in data configured as RDP/RPC.

At block 2206, the wrapped data is passed through a firewall. In a typically implementation seen in FIG. 21, the client plug-in 2116 will call a Win HTTP API to wrap the RDP/RPC data as RDP/RPC/HTTPS, so that it can traverse the firewall.

At block 2208, the RPC-based protocol is removed from the data, and the packets are re-configured according to their intended order. Referring again to FIG. 21, if the data is moving from the client, the service 2126 is configured to remove the RPC-based protocol, revealing the underlying RDP protocol. The service 2126 also reconfigures the packets in their correct order. If the data is moving from the server, the client plug-in 2116 removes the RPC-based protocol.

At block 2210, where the data is moving from the terminal server client 2114 to the terminal server 2110, the data is routed within the stream-based protocol to an appropriate server. Alternatively, at block 2212, if the data is moving from the terminal server to the terminal server client, then the data is displayed as screen information on the client machine.

Figure 23:
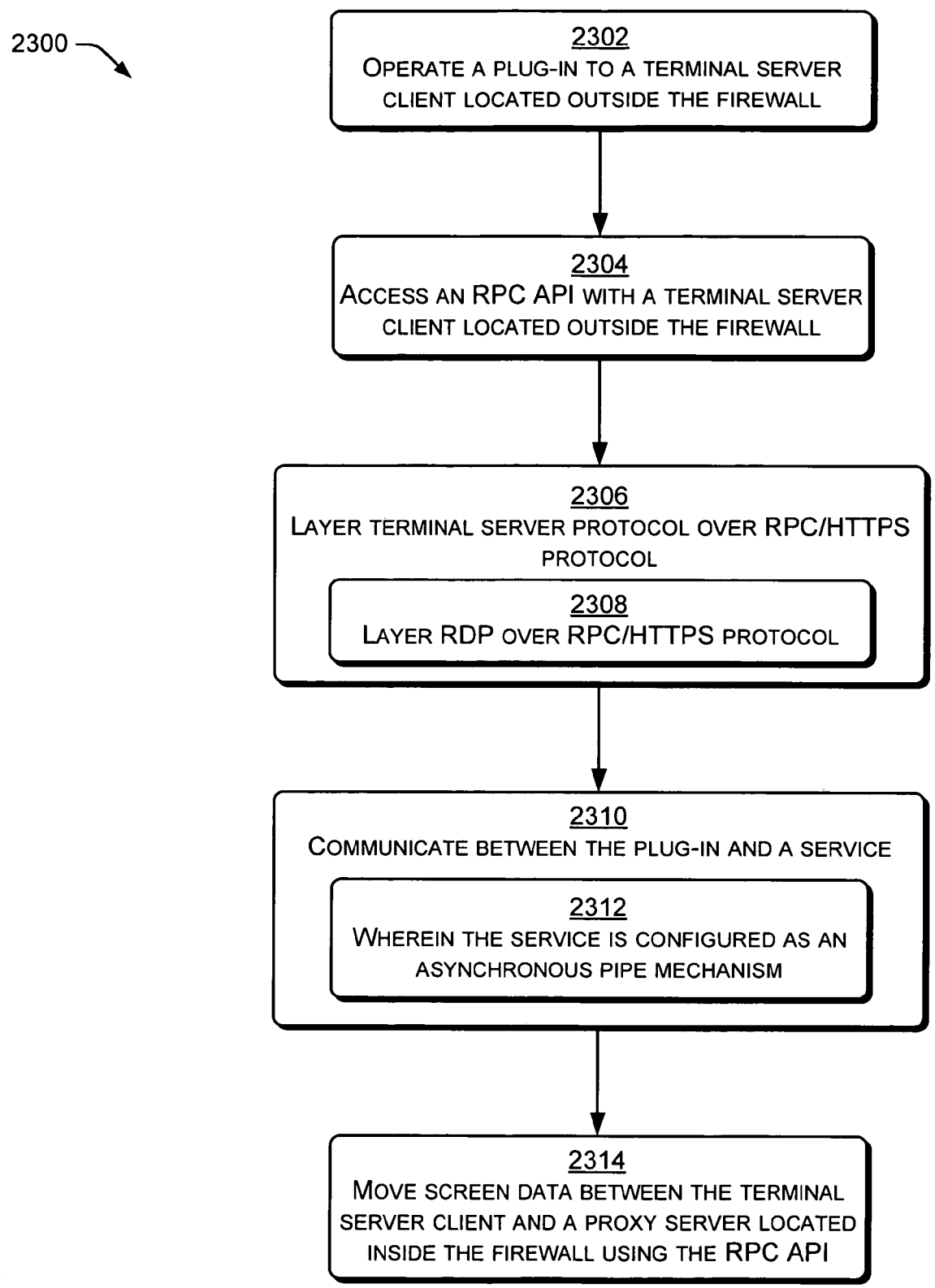
FIG. 23 illustrates an exemplary embodiment for implementing terminal services through a firewall.

FIG. 23 shows an exemplary method 2300 for enabling terminal service through a firewall. At block 2302, a plug-in is operated within a terminal server. In the example of FIG. 21, the client plug-in 2116 is operated within the terminal server client 2114. At block 2304, an RPC API is accessed with a terminal server client located outside the firewall. In the example of FIG. 21, the RPC API 2120 is accessed by the plug-in 2116 of the terminal server client 2114. Both are located outside the firewall 2108.

At block 2306, terminal server protocol is layered over RPC/HTTPS protocol. In the example of block 2308, the terminal server protocol is RDP (remote desktop protocol). At block 2310, the plug-in 2116 and a service 2126 communicate. The communication assists in the transfer of data between the terminal server client 2114 and the terminal server 2110. At block 2312, the communication is configured as an asynchronous pipe mechanism. At block 2314, the screen data is moved between the terminal server client and a proxy server located inside the firewall using the RPC API.

Figure 24:
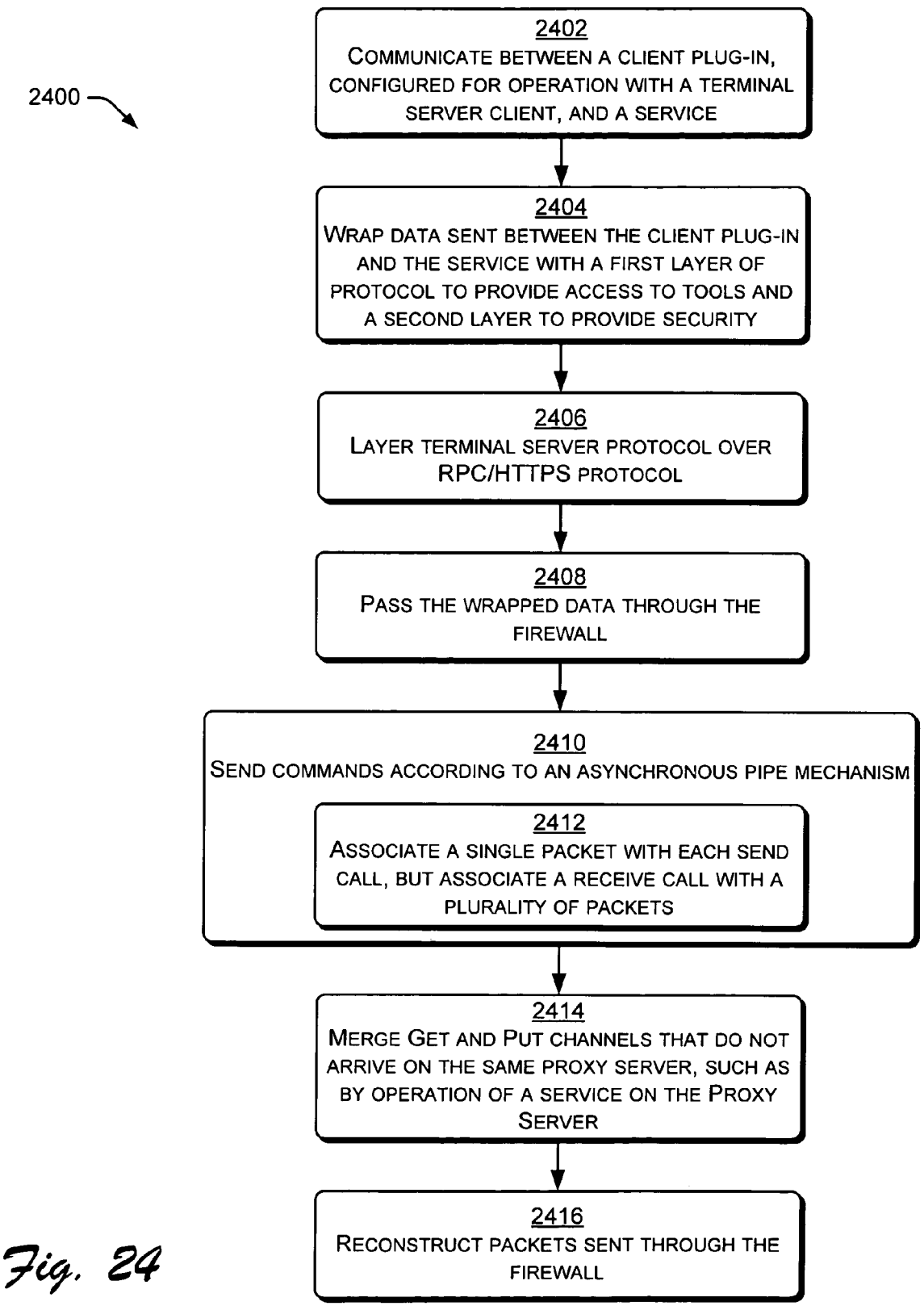
FIG. 24 illustrates an exemplary embodiment for implementing terminal services through a firewall.

FIG. 24 shows an exemplary method 2400 for enabling terminal service through a firewall. At block 2402, a client plug-in (e.g. plug-in 2116 of FIG. 21) configured for operation with a terminal server client (e.g. terminal server client 2114 of FIG. 21) communicates with a service located on a proxy server (e.g. service 2126 on proxy server 2106).

At block 2404, data sent between the client plug-in and the service is wrapped with a first layer of protocol to provide access to tools and a second layer of protocol to provide security. In one example, wrapping the data with RPC allows the client plug-in to access the RPC API and avail itself of the tools provided by that resource. At block 2406, the API could be utilized to wrap the terminal server protocol in RPC/HTTPS. This second layer of protocol provides security as the data moves through the firewall, at block 2408. Once on the inside of the firewall, the packets constituting the data are reconstructed in their intended order. This is typically performed by the service 2126 (FIG. 21).

At block 2410, the commands used to move the data, such as Get and Put commands, are sent according to an asynchronous pipe mechanism. At block 2412, in the asynchronous pipe mechanism, a singe packet of data is associated with each send call, but a receive call is associated with a plurality of packets.

At block 2414, the Get and Put channels that do not arrive on the same proxy server are merged, such as by operation of the service (e.g. service 2126 of FIG. 21) on the proxy server. At block 2416, the packets sent through the firewall are reconstructed. The reconstruction may be performed by the service 2126 on the proxy server.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 25:
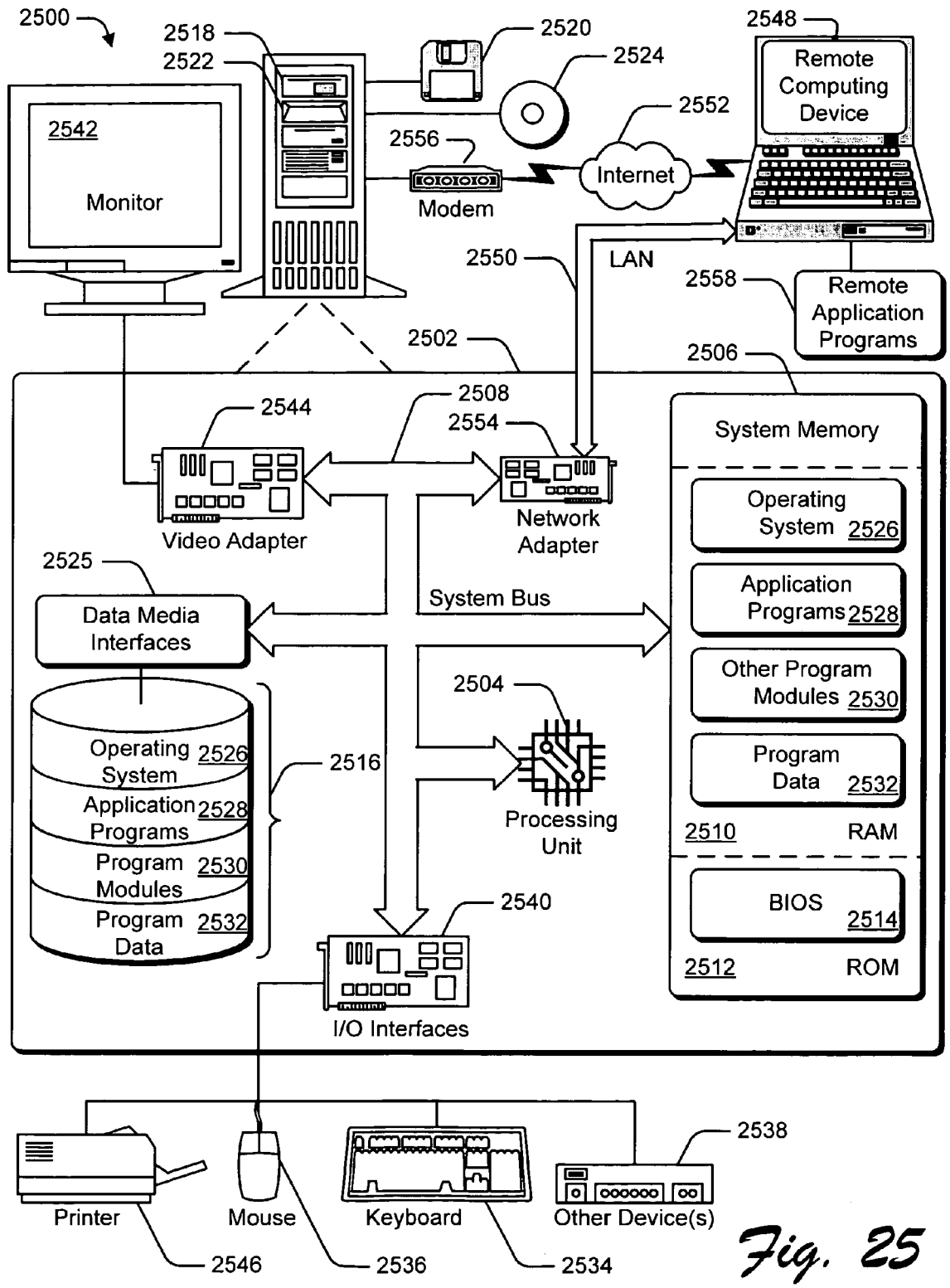
FIG. 25 illustrates an exemplary computing environment suitable for implementing terminal services through a firewall.

FIG. 25 illustrates an exemplary computing environment 2500 suitable for enabling terminal services through a firewall. Although one specific configuration is shown, terminal services may be enabled through a firewall in other computing configurations.

The computing environment 2500 includes a general-purpose computing system in the form of a computer 2502. The components of computer 2502 can include, but are not limited to, one or more processors or processing units 2504, a system memory 2506, and a system bus 2508 that couples various system components including the processor 2504 to the system memory 2506. The system bus 2508 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 2502 typically includes a variety of computer readable media. Such media can be any available media that is accessible by computer 2502 and includes both volatile and non-volatile media, removable and non-removable media. The system memory 2506 includes computer readable media in the form of volatile memory, such as random access memory (RAM) 2510, and/or non-volatile memory, such as read only memory (ROM) 2512. A basic input/output system (BIOS) 2514, containing the basic routines that help to transfer information between elements within computer 2502, such as during start-up, is stored in ROM 2512. RAM 2510 typically contains data and/or program modules that are immediately accessible to and/or presently operated on by the processing unit 2504.

Computer 2502 can also include other removable/non-removable, volatile/non-volatile computer storage media. By way of example, FIG. 10 illustrates a hard disk drive 2516 for reading from and writing to a non-removeable, non-volatile magnetic media (not shown), a magnetic disk drive 2518 for reading from and writing to a removable, non-volatile magnetic disk 2520 (e.g., a "floppy disk"), and an optical disk drive 2522 for reading from and/or writing to a removable, non-volatile optical disk 2524 such as a CD-ROM, DVD-ROM, or other optical media. The hard disk drive 2516, magnetic disk drive 2518, and optical disk drive 2522 are each connected to the system bus 2508 by one or more data media interfaces 2525. Alternatively, the hard disk drive 2516, magnetic disk drive 2518, and optical disk drive 2522 can be connected to the system bus 2508 by a SCSI interface (not shown).

The disk drives and their associated computer-readable media provide non-volatile storage of computer readable instructions, data structures, program modules, and other data for computer 2502. Although the example illustrates a hard disk 2516, a removable magnetic disk 2520, and a removable optical disk 2524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 2516, magnetic disk 2520, optical disk 2524, ROM 2512, and/or RAM 2510, including by way of example, an operating system 2526, one or more application programs 2528, other program modules 2530, and program data 2532. Each of such operating system 2526, one or more application programs 2528, other program modules 2530, and program data 2532 (or some combination thereof) may include an embodiment of a caching scheme for user network access information.

Computer 2502 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 2502 via input devices such as a keyboard 2534 and a pointing device 2536 (e.g., a "mouse"). Other input devices 2538 (not shown specifically) may include a microphone, joystick, game pad, satellite dish, serial port, scanner, and/or the like. These and other input devices are connected to the processing unit 2504 via input/output interfaces 2540 that are coupled to the system bus 2508, but may be connected by other interface and bus structures, such as a parallel port, game port, or a universal serial bus (USB).

A monitor 2542 or other type of display device can also be connected to the system bus 2508 via an interface, such as a video adapter 2544. In addition to the monitor 2542, other output peripheral devices can include components such as speakers (not shown) and a printer 2546 that can be connected to computer 2502 via the input/output interfaces 2540.

Computer 2502 can operate in a networked environment using logical connections to one or more remote computers, such as a remote computing device 2548. By way of example, the remote computing device 2548 can be a personal computer, portable computer, a server, a router, a network computer, a peer device or other common network node, and the like. The remote computing device 2548 is illustrated as a portable computer that can include many or all of the elements and features described herein relative to computer system 2502.

Logical connections between computer 2502 and the remote computer 2548 are depicted as a local area network (LAN) 2550 and a general wide area network (WAN) 2552. Such networking environments are commonplace in offices, enterprise-wide computer networks, intranets, and the Internet. When implemented in a LAN networking environment, the computer 2502 is connected to a local network 2550 via a network interface or adapter 2554. When implemented in a WAN networking environment, the computer 2502 typically includes a modem 2556 or other means for establishing communications over the wide network 2552. The modem 2556, which can be internal or external to computer 2502, can be connected to the system bus 2508 via the input/output interfaces 2540 or other appropriate mechanisms. It is to be appreciated that the illustrated network connections are exemplary and that other means of establishing communication link(s) between the computers 2502 and 2548 can be employed.

In a networked environment, such as that illustrated with computing environment 2500, program modules depicted relative to the computer 2502, or portions thereof, may be stored in a remote memory storage device. By way of example, remote application programs 2558 reside on a memory device of remote computer 2548. For purposes of illustration, application programs and other executable program components, such as the operating system, are illustrated herein as discrete blocks, although it is recognized that such programs and components reside at various times in different storage components of the computer system 2502, and are executed by the data processor(s) of the computer.

Conclusion

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. A computer-implemented method for enabling terminal services through a firewall, the method comprising:
    wrapping data with an RPC-based protocol, wherein the data to be wrapped is configured according to a stream-based protocol consistent with establishing a server/client relationship;
    wrapping the RPC-based protocol with HTTPS;
    passing the wrapped data through the firewall, wherein passing the wrapped data comprises:
        moving screen data to a terminal server client, from a terminal server and through a proxy server, wherein the proxy server and terminal server are located inside the firewall; and
        moving mouse-clicks and keyboard keystrokes from the terminal server client to the terminal server.

2. The method of claim 1, wherein wrapping data with an RPC-based protocol comprises layering RDP over RPC protocol.

3. The method of claim 1, wherein wrapping data with an RPC-based protocol comprises:
    operating a plug-in to a terminal server client located outside the firewall, wherein stream-based protocol is wrapped with the RPC protocol by the plug-in; and
    operating a service, wherein the service is located on the proxy server inside the firewall, wherein the service is in communication with the plug-in, and wherein stream-based protocol is wrapped with the RPC protocol by the service.

4. The method of claim 3, wherein the service is configured according to instructions that implement an asynchronous pipe mechanism.

5. The method of claim 3, wherein the service is located in front of a terminal server farm's load-balancer.

6. The method of claim 1, further comprising:
    operating a plug-in configured for operation with a terminal server client operating outside the firewall, wherein, upon removal of the RPC-based protocol, the plug-in provides stream-based protocol to the terminal services client; and
    operating a service on the proxy server, wherein, upon removal of the RPC-based protocol, the service routes data configured according to a stream-based protocol to an indicated terminal server inside the firewall.

7. The method of claim 6, wherein the client plug-in is configured to utilize an RPC API to wrap data configured as RDP/RPC over HTTPS for transmission through the firewall.

8. The method of claim 1, further comprising:
    accessing an RPC API with the terminal server client located outside the firewall, wherein the accessing is performed by a plug-in configured to wrap and unwrap the stream-based protocol with RPC and wherein the accessing wraps or unwraps the data in HTTPS.

9. The method of claim 1, further comprising:
    routing the data within the stream-based protocol to an appropriate server after passing the data inside the firewall; and
    displaying the data as screen information on the client after passing the data outside the firewall.

10. The method of claim 1, further comprising:
    removing the HTTP-based protocol from the wrapped data;
    removing the RPC-based protocol from the wrapped data.

11. A system configured for enabling terminal services through a firewall, comprising:
    a client plug-in, wherein the client plug-in is configured to utilize an RPC API to wrap data configured as RDP/RPC over HTTPS for transmission through the firewall, wherein the client plug-in is configured for communication with a terminal service client located outside the firewall, and wherein the client plug-in is configured for adding RPC protocol to outgoing data and for removing the RPC protocol from incoming data; and
    a service, wherein the service is located in front of a terminal server farm's load-balancer, wherein the service is configured to run on a proxy server located inside the firewall, and wherein the service is configured to reconstruct packets sent by the client plug-in and to forward them to an appropriate terminal server.

12. The system of claim 11, wherein the service is configured for sending and receiving data according to an asynchronous pipe mechanism.

13. The system of claim 12, wherein the asynchronous pipe mechanism is configured to make a send call for each packet, but utilizes only one receive call for a plurality of packets.

14. The system of claim 11, wherein the service is configured for sending and receiving data according to a multiple-asynchronous mechanism.

15. One or more computer storage memories storing computer-executable instructions for enabling terminal services through a firewall, the computer-executable instructions comprising instructions for:
    communicating between a client plug-in, configured for operation with a terminal server client, and a service, configured for operation on a proxy server;
    wrapping data sent between the client plug-in and the service with a first layer of protocol to provide access to tools and a second layer of protocol to provide security;
    wherein wrapping data with a first layer of protocol to provide access to tools comprises instructions for wrapping RDP over RPC (remote procedure call);
    wherein providing access to tools comprises instructions for accessing an RPC API (application programming interface); and
    wherein wrapping data with a second layer of protocol to provide security comprises instructions for wrapping RDP (remote desktop protocol)/RPC over HTTPS (hypertext transfer protocol secure);
    passing the wrapped data through the firewall;
    accessing an RPC API with the terminal server client, wherein the terminal server client is located outside the firewall, wherein the accessing is performed by a plug-in configured to wrap and unwrap the stream-based protocol with RPC and wherein the accessing wraps or unwraps the data in HTTPS;
    moving screen data to the terminal server client, from a terminal server and through the proxy server, wherein the proxy server and terminal server are located inside the firewall; and moving mouse-clicks and keyboard keystrokes from the terminal server client to the terminal server, through the proxy server and the firewall.

16. The one or more computer storage memories of claim 15, wherein communicating between the client plug-in and the service comprises instructions for:

sending commands according to an asynchronous pipe mechanism, wherein a single packet is associated with each send call, but a receive call is associated with a plurality of packets.

17. The one or more computer storage memories of claim 15, wherein communicating between the client plug-in and the service comprises instructions for:

sending commands according to a multiple-asynchronous mechanism, wherein a single packet is associated with each send call and each receive call.

18. The one or more computer storage memories of claim 15, wherein wrapping data sent between the client plug-in and the service comprises instructions for:

layering terminal server protocol over RPC/HTTPS protocol.

19. The one or more computer storage memories of claim 15, wherein the service is additionally configured for merging Get and Put channels that do not arrive on the same proxy server.

* * * * *